United States Patent [19]
Eggert et al.

[11] Patent Number: 5,853,292
[45] Date of Patent: Dec. 29, 1998

[54] COMPUTERIZED EDUCATION SYSTEM FOR TEACHING PATIENT CARE

[75] Inventors: John S. Eggert, Miami; Michael S. Eggert, Gainsville; Phillip Vallejo, Miami, all of Fla.

[73] Assignee: Gaumard Scientific Company, Inc., Miami, Fla.

[21] Appl. No.: 643,435

[22] Filed: May 8, 1996

[51] Int. Cl.⁶ .................................................. G09B 23/28
[52] U.S. Cl. .................... 434/262; 434/265; 434/266; 434/267
[58] Field of Search .................................. 434/262, 265, 434/266, 267; 364/578

[56] References Cited

U.S. PATENT DOCUMENTS

| | | | |
|---|---|---|---|
| 4,360,345 | 11/1982 | Hon ........................................ | 434/307 |
| 4,907,973 | 3/1990 | Hon ........................................ | 434/262 |
| 5,137,458 | 8/1992 | Ungs et al. ............................... | 434/262 |
| 5,454,722 | 10/1995 | Holland et al. ........................... | 434/271 |
| 5,509,810 | 4/1996 | Schertz et al. ........................... | 434/262 |
| 5,609,485 | 3/1997 | Bergman et al. ......................... | 434/262 |
| 5,704,791 | 1/1998 | Gillio ...................................... | 434/262 |

OTHER PUBLICATIONS

University of Miama, Division of Research in Medial Eduction, "Harvey"*–The Cardiology Patient Simulator, pp. 1–5.

Medical Education Technologies, Inc., Human Patient Simulator,1996.

Loral Data Systems, Loral Data Systems Delivers Human Patient Simulator,Aug. 1994.

Loral Data Systems, Physiology, Pharmacology & Technology together in the Human Patient Simulator,Aug. 1994.

Loral Data Systems, Educational Curriculum Example Scenario,Jul. 1994.

Loral Data Systems, Physiology, Pharmacology & Technology together in the Human Patient Simulator,Mar. 1994.

Primary Examiner—Robert A. Hafer
Assistant Examiner—John Edmund Rovnak
Attorney, Agent, or Firm—Haynes and Boone, L.L.P.

[57] ABSTRACT

An interactive, computerized education system for teaching patient care includes an interactive computer program for use with a simulator, such as a manikin, and virtual instruments for performing simulated patient care activity under the direction of the program. The program displays a selection of modules to assist a user in learning patient care protocols, the modules being selectable by the user for providing different interactive training sessions involving the protocols. The virtual instruments are used with the simulator in performing the patient care activity, the virtual instruments cooperating with sensors that interface with the computer program for providing feedback to the program regarding the activity and confirming proper placement and use of the virtual instruments on the simulator.

17 Claims, 31 Drawing Sheets

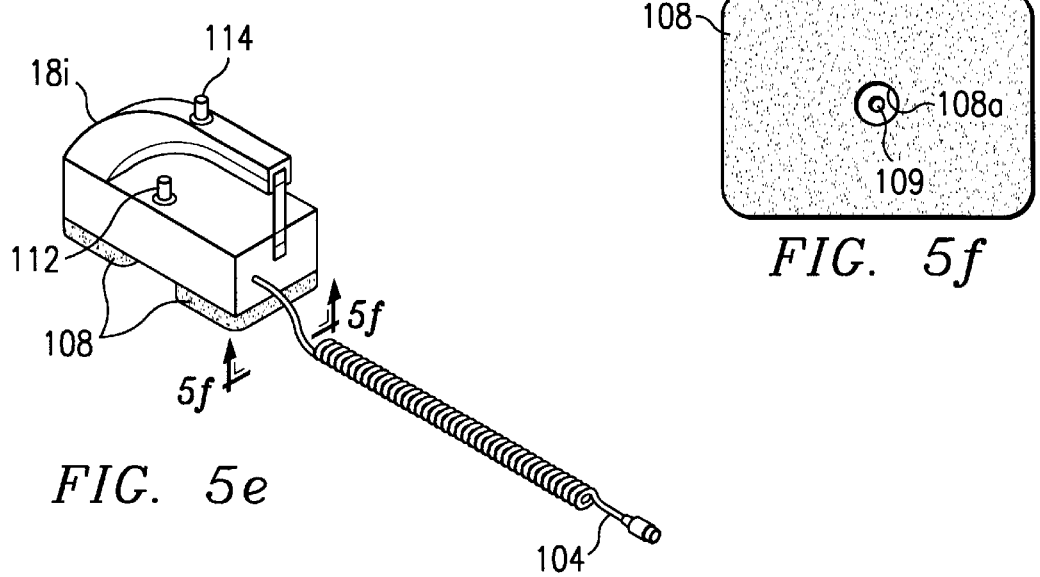
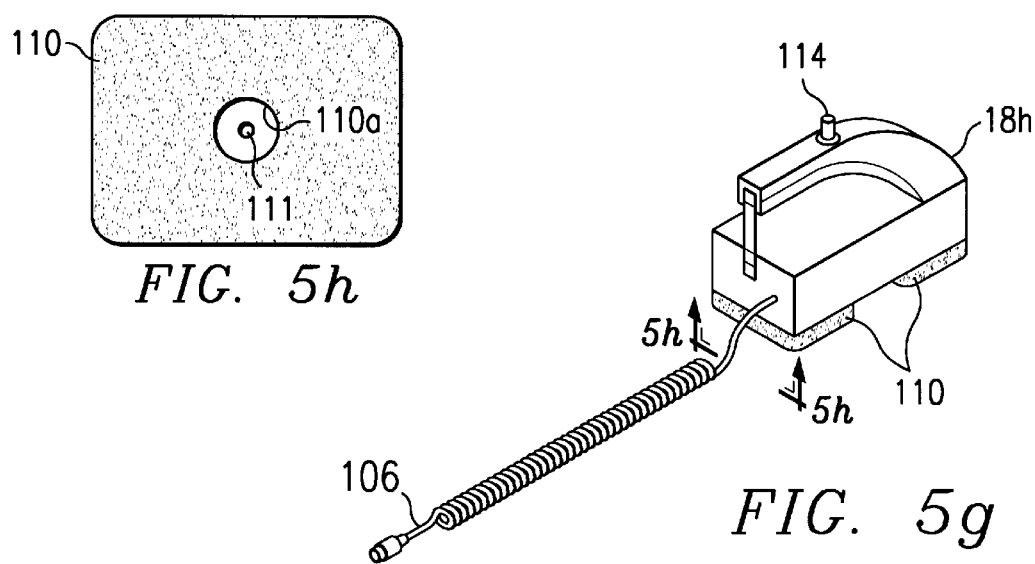
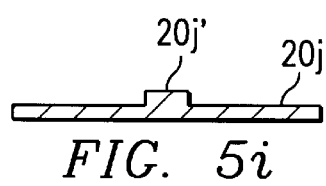

FIG. 9

Intro  CPR  FBO  Practice  Quit

BASIC LIFE SUPPORT

———— \cdb3\bls\bintro.txt ————

INTRODUCTION

* Basic Life Support (BLS) is the foundation upon which Advanced Life Support (ALS), Cardiopulmonary resuscitation (CPR), Foreign Body Obstruction (FBO), or Advanced Cardiac Life Support (ACLS) is based.

* BLS consists of CPR and FBO techniques

* This module will address CPR and FBO, then apply the knowledge to PRACTICE sessions through the use of an adult teaching manikin.

* This PRACTICE module allows the student to select CPR Practice of CPR Test Speed. CPR Practice allows the student to progress at his/her own speed. CPR Test Speed allows the student to conduct CPR at the speed recommended by the AHA. Students are frequently surprised at the pace required to meet the AHA guidelines.

Back    Next ⇨    Exit

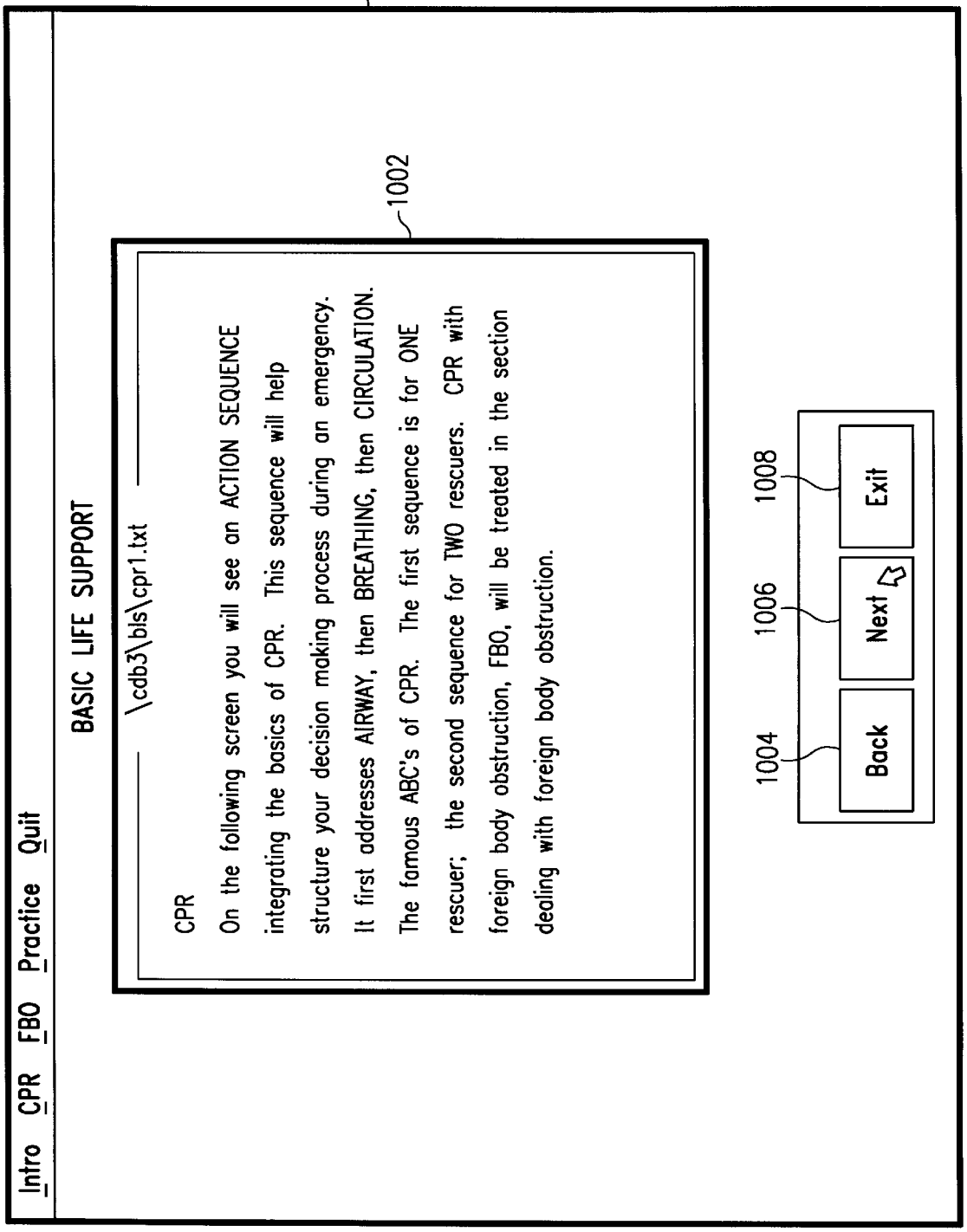

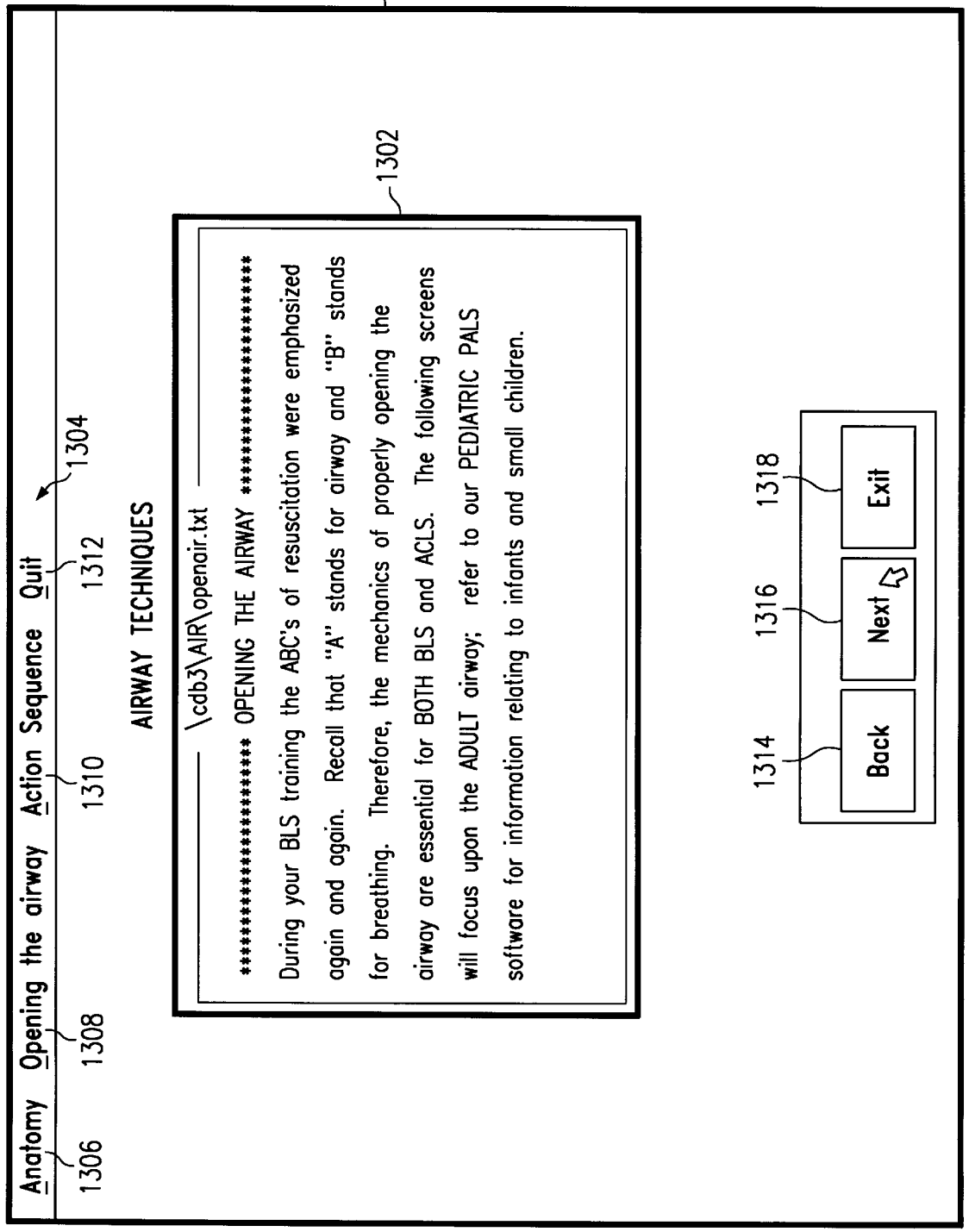

FIG. 28

| DRUGS A to D | DRUGS E to N | DRUGS O to Z | Quit |

DRUG THERAPY

\cdb3\med\adeno.MED

ADENOSINE
DOSAGE:
 * 6.0 mg. rapid IV push.
 IF AFTER 1-2 MINUTES CARDIOVERSION DOES NOT OCCUR.
 * 12 mg. rapid IV push.
INDICATIONS:
 * Paroxysmal supraventricular tachycardia – PSVT.
 * Wide-complex tachycardia of uncertain type.
USED TO:
 Suppress supraventricular tachycardia.
ACTIONS:
 Depresses AV and sinus node activity.
SIDE EFFECTS:
 * CNS – Transient periods of bradycardia and ventricular ectopy are common after termination of SVT with adenosine.
 * CVS – Dizziness.
 * OTHER – Facial flushing, headache, shortness of breath, chest pain and nausea.
PRECAUTIONS:
 Should not be used in;
 2nd or 3rd degree heart block.
 Sick sinus syndrome.
 Known hypersensitivity to the drug.
 USE WITH CAUTION IN : asthma patients

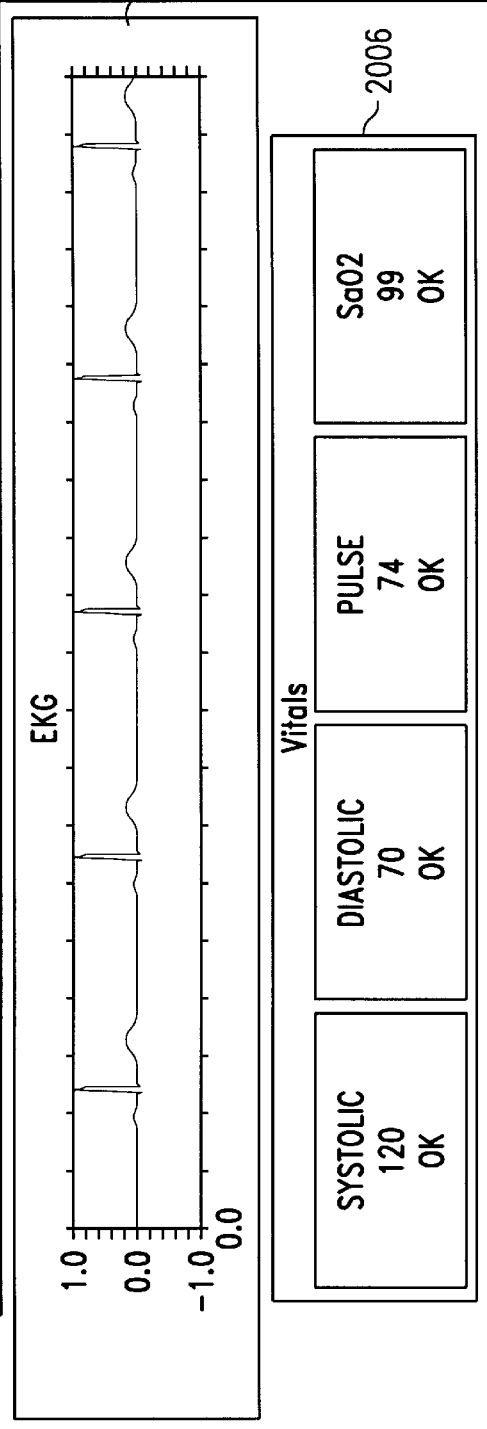

Treatment  Action Sequence  Trace Control  Quit

\cdb3\trt\abt_trt.txt

Welcome to the TREATMENT module which consists of many ACTION SEQUENCES. Each assumes a thorough working knowledge of the teaching modules and each is intended to prepare the student for CODE SCENARIOS presented in the TEST SECTION.

Be sure to consult your ACLS manual provided with this software for additional information regarding treatments.

Treatment : Use the treatment pull down menu to begin the treatment action sequence.

Action Sequence : Use the Action sequence pull down menu, to select a treatment protocol.

Trace Control : Use the Trace pull down menu, to adjust the EKG trace speed.

Quit : This will take you out of the Treatment teaching module and return you to the MAIN MENU.

1  2  3  4  5  BACK  EXIT

EKG

| SYSTOLIC | DIASTOLIC | PULSE | SaO2 |
| 120 | 70 | 74 | 99 |
| OK | OK | OK | OK |

Vitals

COMPUTERIZED EDUCATION SYSTEM FOR TEACHING PATIENT CARE

BACKGROUND OF THE INVENTION

The present invention relates generally to an interactive, computerized education system for teaching patient care, and more particularly to such a system for use in conducting life support training sessions using virtual instruments in cooperation with a manikin.

Multiple and interrelated life support skills, such as those taught in Basic Life Support (BLS) courses and Advanced Cardiac Life Support (ACLS) courses, have conventionally been taught using a number of different training devices such as, for example, a training manikin configured to simulate a human patient. Hypothetical emergency situations are simulated with the manikin and students utilize instruments to monitor the manikin for its vital signs, such as its systolic and diastolic pulse, and its EKG. The students then take responsive action and observe the effects of their actions on the manikin.

A drawback to the foregoing practice is that large capital outlays must be made for the required equipment. The required manikin is relatively expensive, particularly if it is sufficiently sophisticated to be used to teach a broad variety of skills. For example, one such manikin, provided by Loral Data Systems, is excessive in its cost in part because the instruments used to monitor the manikin are the same as those which are used in actual practice. While such instruments may be borrowed from a practicing physician, their availability in a complete kit with the training equipment is preferred. Consequently, the use of these manikins and associated instruments is prohibitively costly for many students and, as a result, many students must forego needed training or settle for less comprehensive training than they may otherwise receive.

Other, more recently developed training manikin systems are also deficient. For example, Nasco has developed a "crisis" manikin which includes an arm that simulates blood pressure, and generates Korticoff sounds that may be detected by a stethoscope. Pads are also provided for applying defibrillators to the Nasco manikin. Real defibrillators, however, are required with the Nasco manikin which, in addition to being expensive, also pose a danger from the high quantity of energy that passes through them. Laerdal Medical Corporation has developed "hardware-oriented" manikins that are specifically designed for certain instruments and are, therefore, relatively expensive and of limited versatility and expandability. Armstrong has developed a manikin that is useful for training with arrhythmias, but is very limited otherwise. For example, the Armstrong manikin has no provision for using many instruments, such as a pacer, that is commonly needed in a "Code" situation. The foregoing training manikin systems do not integrate a broad variety of instruments commonly used in "Code" situations, and furthermore, are adaptable to a wide variety of different kinds of "hands-on" training scenarios in a cost efficient manner.

Multiple and interrelated life support skills may, alternatively, be taught from less expensive resources such as textbooks and flash cards. For example, Grauer and Cavallaro have authored a textbook entitled "ACLS Volumes I and II: Certification Preparation and A Comprehensive Review" and have developed flash cards entitled the "1994 ACLS Pocket Reference" both of which attempt to teach such skills. The American Heart Association has published an authoritative reference on Advanced Cardiac Life Support (ACLS). While providing a low cost source for learning theory, textbooks and flash cards clearly lack the important benefit that can only be acquired from "hands-on" training and practice. Training materials of the foregoing type must also be updated frequently with advances in medical training, making it difficult for users to be current in recommended teachings.

Therefore, what is needed is a system for enabling students to learn, through "hands-on" training, comprehensive multiple and interrelated life support skills, without sacrificing the experience gained by students in using instruments in a simulated patient treatment situation, and which system is readily expandable and updatable without large capital outlays.

SUMMARY OF THE INVENTION

The present invention, accordingly, provides an interactive computerized education system for teaching patient care utilizing a computer program in cooperation with virtual instruments to perform patient care activities on a simulator such as a manikin.

To this end, an interactive, computerized education system for teaching patient care includes a computer program for use with a simulator, such as a manikin, and virtual instruments for performing simulated patient care activity under the direction of the program. The program displays a selection of modules to assist a user in learning patient care protocols, the modules being selectable by the user for providing different interactive training sessions involving the protocols. The virtual instruments are used with the simulator in performing the patient care activity and cooperate with sensors that interface with the computer program for providing feedback to the program regarding the activity and confirming proper placement and use of the virtual instruments on the simulator.

An advantage achieved with the present invention is that students may be provided with virtual instruments that are much less expensive than real instruments, but that look, feel, and act like real instruments.

Another advantage of the present invention is that training may be performed on a readily-available, sensor-equipped manikin, thereby obviating the need for an actual victim.

Another advantage of the present invention is that a student may pace himself as he progresses through the training.

Another advantage of the present invention is that it is easily translatable and adaptable to different kinds of training scenarios.

Another advantage of the present invention is that the computer program, virtual instruments, and sensors, and hence the entire system, may be easily updated or replaced to ensure that state-of-the-art training is provided and is in accord with approved medical procedures and standards.

BRIEF DESCRIPTION OF THE DRAWINGS

FIGS. 5e–5h illustrate various views of defibrillators for use with the system of FIG. 2.

FIGS. 5i–5j illustrate cross-sectional views of sensors for use with the defibrillators of FIGS. 5e–5h.

FIG. 9 is a screen display of introduction generated upon selection of an introduction menu item of the decision tree of FIG. 8.

FIGS. 10–12 are screen displays of CPR graphics generated during a CPR training sequence initiated by selection of a CPR menu item of the decision tree of FIG. 8.

FIG. 13 is a screen display generated upon selection of the Airways module of the display of FIG. 6.

FIG. 28 is a representative screen display generated by the Drugs module of FIG. 27.

FIG. 29 is screen display generated upon selection of the Treatments module of the display of FIG. 6.

DETAILED DESCRIPTION OF THE PREFERRED EMBODIMENT

Figure 1:
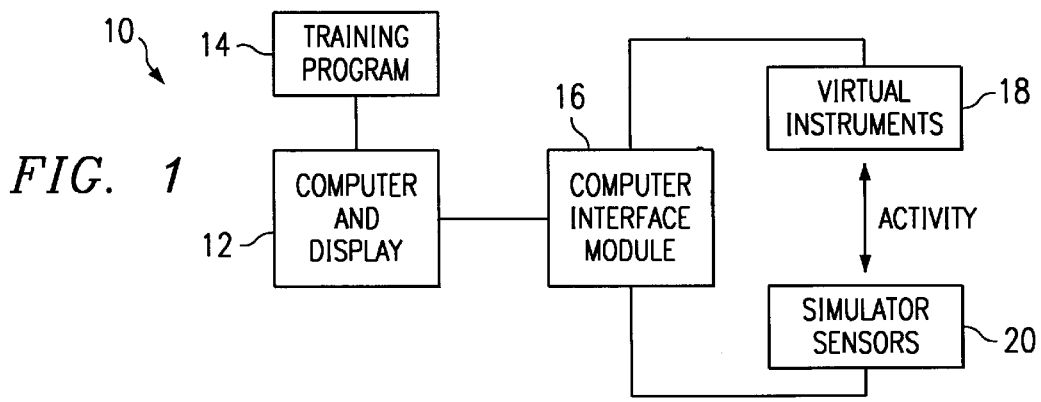
FIG. 1 is a block diagram of a computerized education system of the present invention.
Figure 4A:
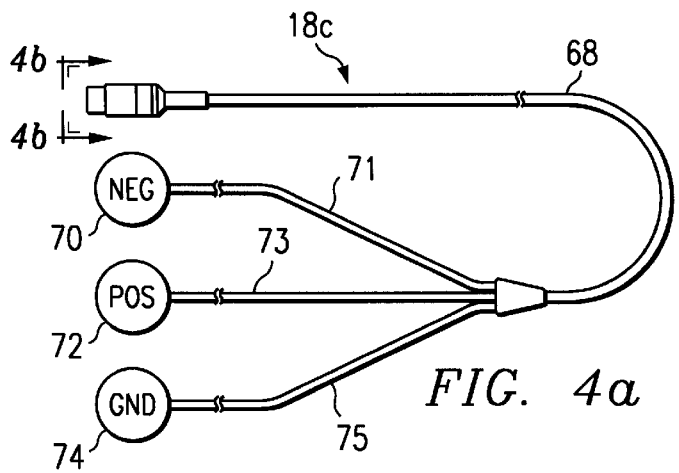
FIGS. 4a–4e illustrate various views of an EKG monitor for use with the system of FIG. 2.
Figure 4B:
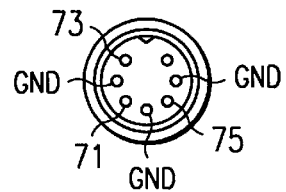
Figure 4C:
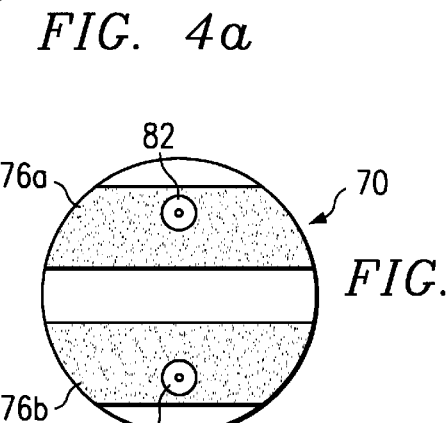
Figure 4D:
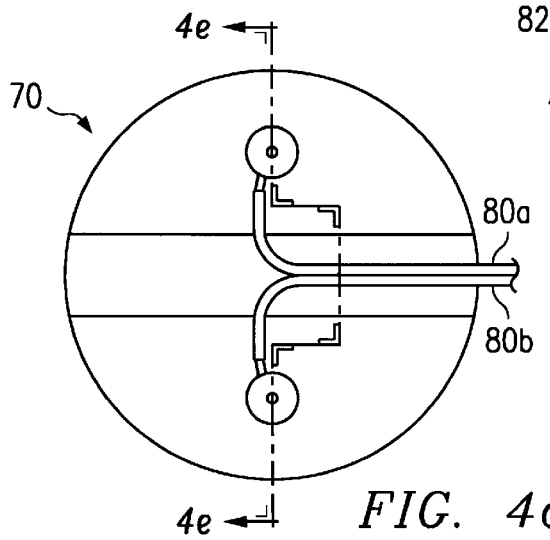
Figure 4E:
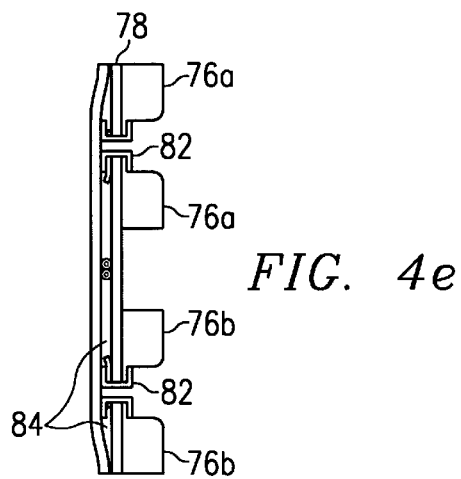

In FIG. 1, the reference numeral 10 refers, in general, to a computerized education system of the present invention. The system 10 includes a computer 12 (with display), a training program 14 for operation thereon, and a computer interface module (CIM) 16 connected to the computer 12. One or more virtual instruments 18 and one or more sensors 20 are also connected to the CIM 16. As will be explained in detail below, the sensors 20 are positioned on a simulator device, such as a patient care manikin (FIG. 2), and on the virtual instruments 18, which are used in training sessions on the manikin, in cooperation with training modules of the program 14 that operate on the computer 12 in interactive training sessions. While a manikin is shown in the preferred embodiment of the system 10, it is understood that the simulator device may be any type of anatomical or gynecological device or other device upon which simulated training of some sort, medical or otherwise, is desired.

Figure 2:
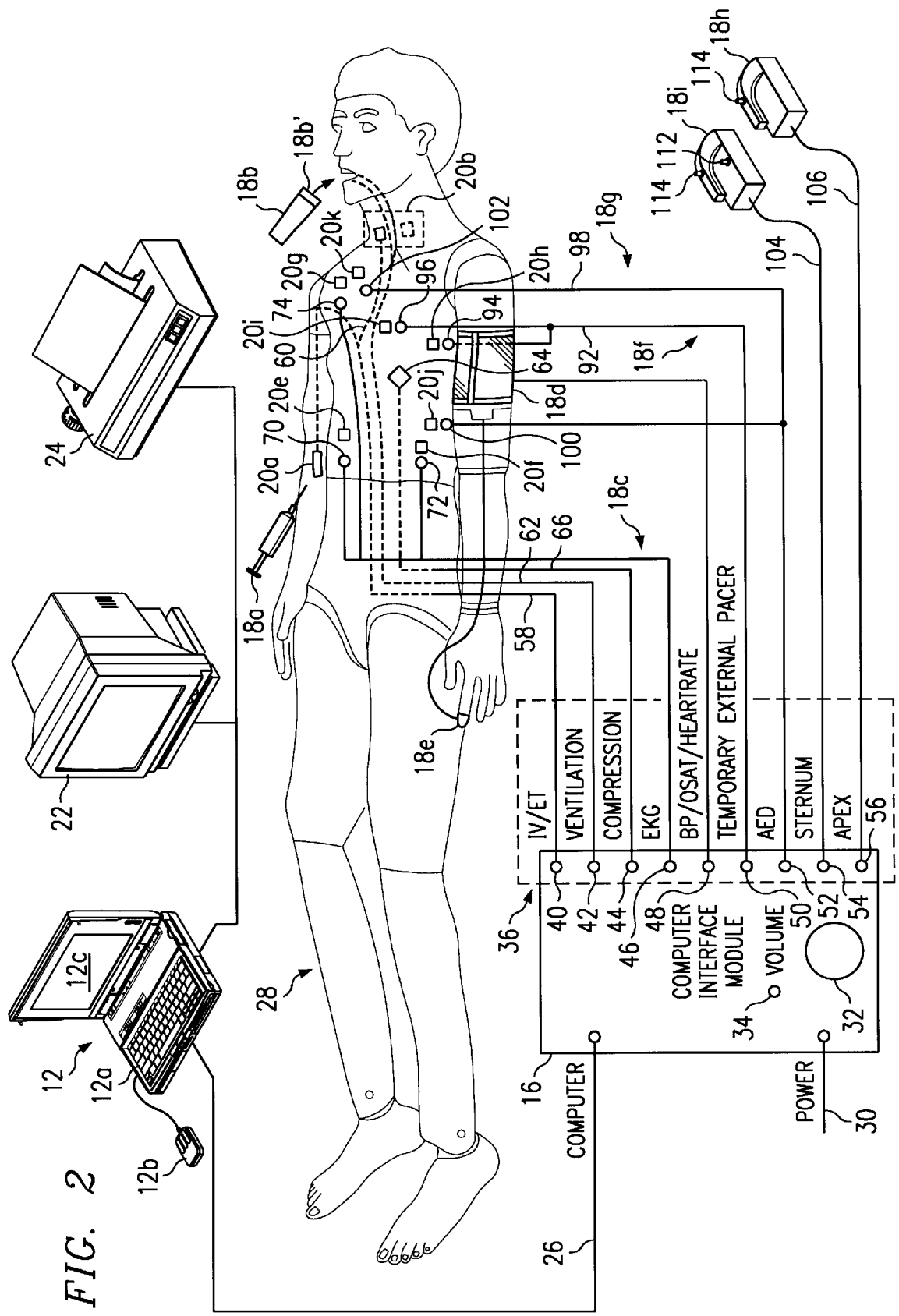
FIG. 2 is a schematic diagram of the system of FIG. 1 illustrating its use in conjunction with a manikin.

Referring also to FIG. 2, the computer 12 is preferably a notebook computer, although any other computer may be utilized. The computer 12 includes a central processing unit (CPU, not shown), such as an Intel 80486 microprocessor or a faster microprocessor, and associated memory and circuitry (not shown). The associated memory preferably comprises at least 4 megabytes of random access memory (RAM) and a hard disk memory for storing and executing the training program 14, described below. A keyboard 12a, a mouse 12b, and a display 12c provide a user interface to the computer 12. A serial port (not shown) provides an interface to the CIM 16. Although optional, a color video monitor 22 and a printer 24 also are operatively connected to the computer 12 through appropriate ports (not shown).

Figure 3A:
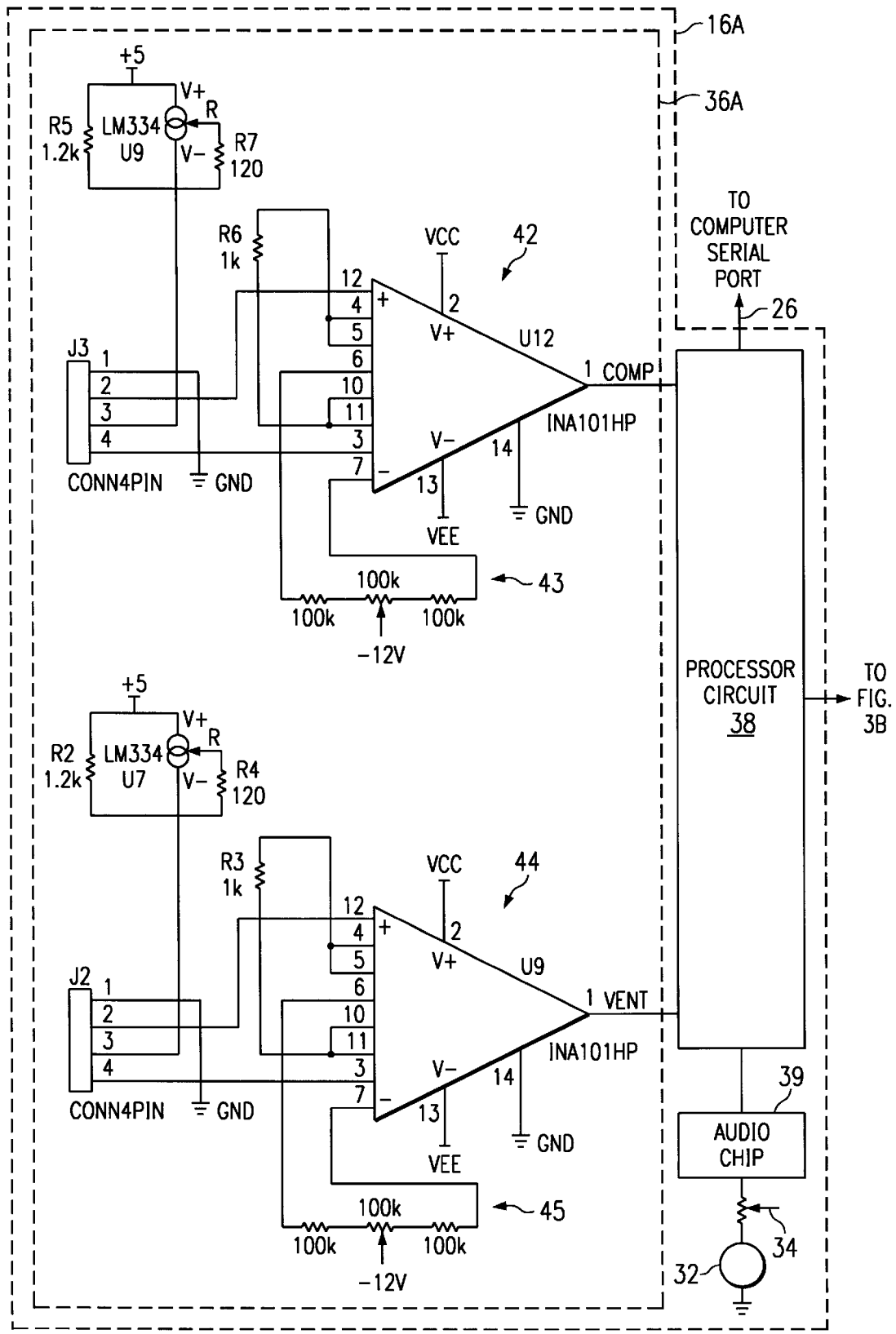
FIG. 3 is a schematic diagram of the computer interface module of the system of FIG. 2.
Figure 3B:
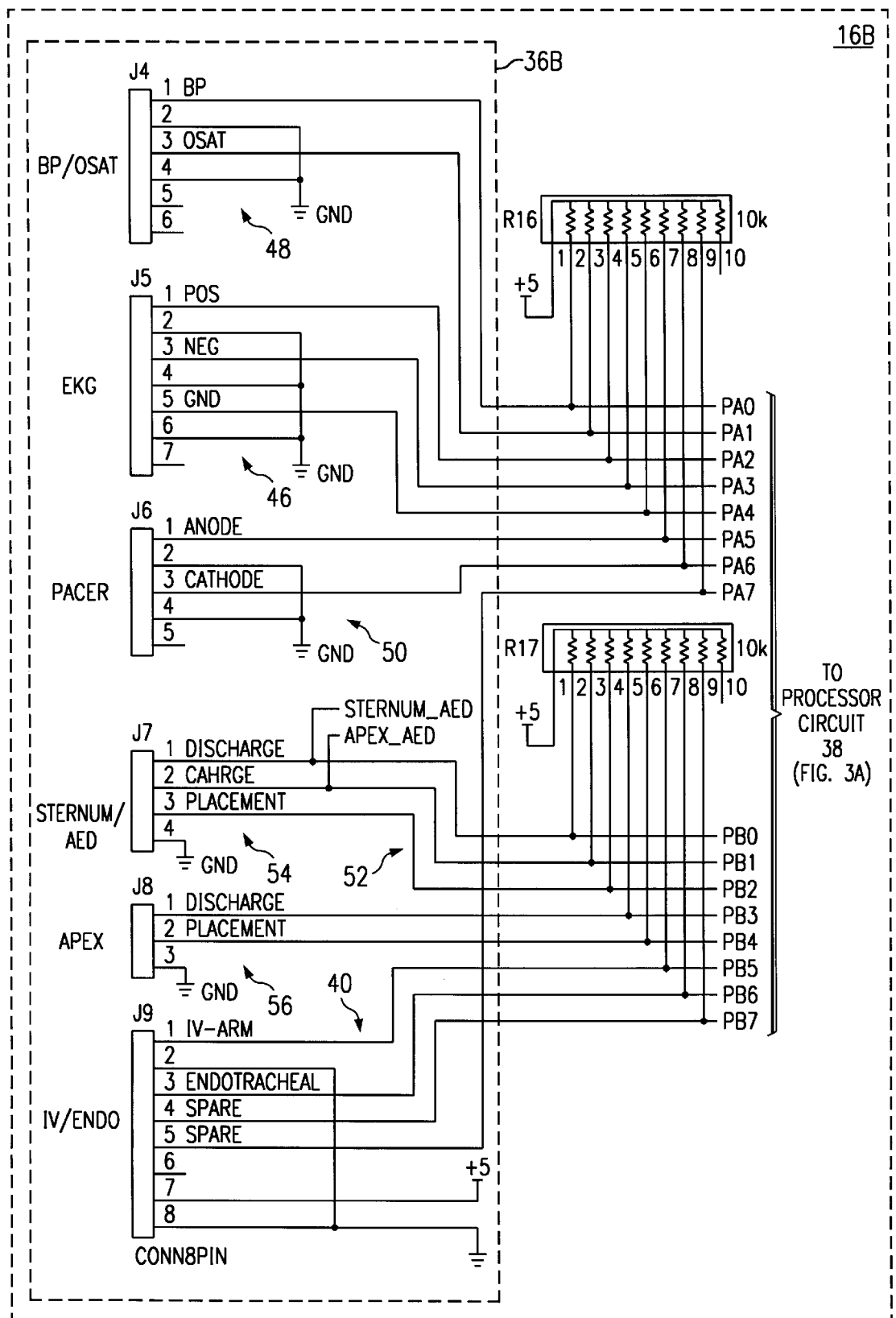

Referring to both FIGS. 2 and 3, the CIM 16 is operatively connected via a line 26 to the serial port (not shown) of the computer 12 for providing an interface between the computer 12 and the sensors 20 (FIG. 1), which sensors, in the present embodiment, are positioned on the virtual instruments 18 and on a patient care simulator in the form of a manikin 28 configured to resemble a life-size human.

The CIM 16 receives operating power via a power line 30 (FIG. 2) from a conventional power source, such as a wall AC outlet (not shown), filtered through a transformer (not shown), or is otherwise provided using batteries (not shown). A speaker 32 (FIG. 2) is included with the CIM 16, for providing audio feedback and instruction as further described below, and a rheostat control 34 is provided for adjusting the volume of the speaker 32.

The CIM 16 includes a number of ports 36 (CIM ports 36) to which the virtual instruments 18 and sensors 20 are connected. The CIM 16 also includes a processor circuit 38 (FIG. 3) connected for receiving input signals from the virtual instruments 18 and the sensors 20 through the CIM ports 36. As will be described in detail below, the processor circuit 38 (such as a RISC-based processor made by Microchip, Inc. of Chandler, Ariz., as model number PIC 16C74-10) processes the received input signals to provide feedback information to the computer 12 pertaining to activity performed by a user on the manikin 28, which information is used by the program 14 for providing interactive training sessions. The CIM 16 additionally includes an audio chip 39 responsive to the processor circuit 38 for supplying electrical current via the rheostat control 34 to cause the speaker 32 to produce heart and lung sounds and other body sounds.

The CIM ports 36 include an intravenous/endotracheal (IV/ET) port 40, a ventilation port 42, a compression port 44, an electrocardiogram (EKG) port 46, a blood pressure, pulse oximeter, heartrate (BP/$O_{SAT}$/HEARTRATE) port 48, a temporary external pacer port 50, an automatic external defibrillator (AED) port 52, and sternum and apex manual defibrillator ports 54, 56. FIG. 3 illustrates in detail the signal lines comprising the CIM ports 36 and shows their connection to the processor circuit 38. Notably, the ventilation port 42 and the compression port 44 include respective self-nulling circuits 43 and 45, each of which includes a negative 12 volt bias.

The connection of the virtual instruments 18 and the sensors 20 to the CIM ports 36 will now be described in connection with FIGS. 2–5. The virtual instruments 18 include a metallic IV needle 18a, an ET tube 18b, an EKG monitor 18c, a BP cuff 18d, a pulse oximeter finger cuff 18e, a temporary external pacer 18f, and AED 18g, and sternum and apex manual defibrillators 18h, 18i. The sensors 20 that correspond with the virtual instruments 18, with respect to their nature and precise placement in the manikin 28, depend upon the virtual instrument activity being monitored and in this context are described in detail below.

The metallic IV needle 18a is used in the confirmation of venous cannulation in the antecubital region of an arm of the manikin 28. A sensor 20a is embedded within an antecubital region of an arm of the manikin 28. The sensor 20a comprises an insulator sandwiched between two layers of conductive material (not shown), which layers of conductive material may, for example, be fabricated from nylon cloth impregnated with silver. The nylon cloth has an appropriate thickness and weave density for permitting the metallic needle 18a to pass through the cloth at a low acute angle (e.g., 20°) into a vein in the arm of the manikin 28. The conductive layers of the sensor 20 are electrically coupled by a line 58 to the IV/ET port 40. It can be appreciated that when the metallic needle 18a is correctly passed through the two conductive layers, i.e., when the needle correctly cannulates the vein in the arm of the manikin 28, a circuit is completed between the layers, and the circuit completion is sensed by the CIM 16 via the line 58 and the port 40, thereby confirming correct cannulation of the vein.

The ET tube 18b is used to confirm proper placement in the tracheal airway of the manikin 28. A sensor 20b, comprising an optical sensor of conventional design, is mounted in the wall of the trachea of the manikin 28 and connected by a line 60 to the IV/ET port 40. The ET tube 18b is fitted with a piece of reflective tape 18b' fitted near the distal, or lower, end of the tube. Correct placement of the ET tube 18b in the trachea is confirmed when the distal reflective tip of the ET tube interrupts the beam of the optical sensor 20b.

An air line 62 is similarly mounted in tracheal wall of the manikin 28 and is connected to the ventilation port 42. A sensor circuit, designated generally as part of the port 42 and illustrated in FIG. 3, is located within the CIM 16 and is connected to the air line 62 so that when cardiopulmonary resuscitation (CPR) ventilation is performed on the manikin 28, the CIM 16 monitors, via the air line 62 and the sensor of the port 42, the timing and magnitude of the pressure and volume of the ventilation procedure.

A compression bladder 64 is embedded within the chest cavity of the manikin 28 for sensing and confirming proper execution of a CPR chest compression procedure, for example. The bladder 64 is connected by an air line 66 to the compression port 44 in the CIM 16. A compression sensor circuit, designated generally as part of the compression port 44 (FIG. 3), is positioned within the CIM 16 and is connected to the air line 66 via the port 44. The compression sensor circuit of the port 44 includes circuitry (as illustrated) for confirming the timing and magnitude of compression.

FIGS. 4a–4e illustrate an EKG monitor 18c. The EKG monitor 18c includes a cable 68 that connects to the EKG port 46 and trifurcates into a white negative sensing patch 70, a red positive sensing patch 72, and a black ground sensing patch 74 for connection to the appropriate regions, respectively, of the torso of the manikin 28. Electrical leads 71, 73, and 75 connected to the respective color-coded patches 72, 74, and 76 are depicted at one end of the cable 68 in FIG. 4b for connection to the EKG port 46 (FIG. 3). The sensing patches 70–74 comprise two spaced sections of conductive velcro 76a, 76b mounted to an insulated disc 78 with separate electric lines 80a, 80b of the cable 68 connecting to each of the velcro sections 76a, 76b. Eyelet rivets 82a, 82b secure the velcro sections 76a, 76b conductively to the lines 80a, 80b, respectively. Adhesive filler 84 fills the space between front and back portions of the disc 78. Sensors 20e, 20f and 20g (FIG. 2) are mounted on the correct regions of the torso of the manikin 28, respectively. The sensors 20e, 20f, 20g each comprise a single pad of conductive velcro configured so that when the sensing patches 70, 72, 74 engage the respective sensors, an electrical circuit is completed between the velcro sections 76a, 76b and the lines 80a, 80b of each of the three sensing patches 70, 72, and 74. In this manner, the CIM 16, through the EKG port 46, is able to confirm proper placement of the EKG monitor 18c on the manikin 28. As will be subsequently described, this technique is also used with the AED 18g and the pacer 18f virtual instruments 18.

Figure 5A:
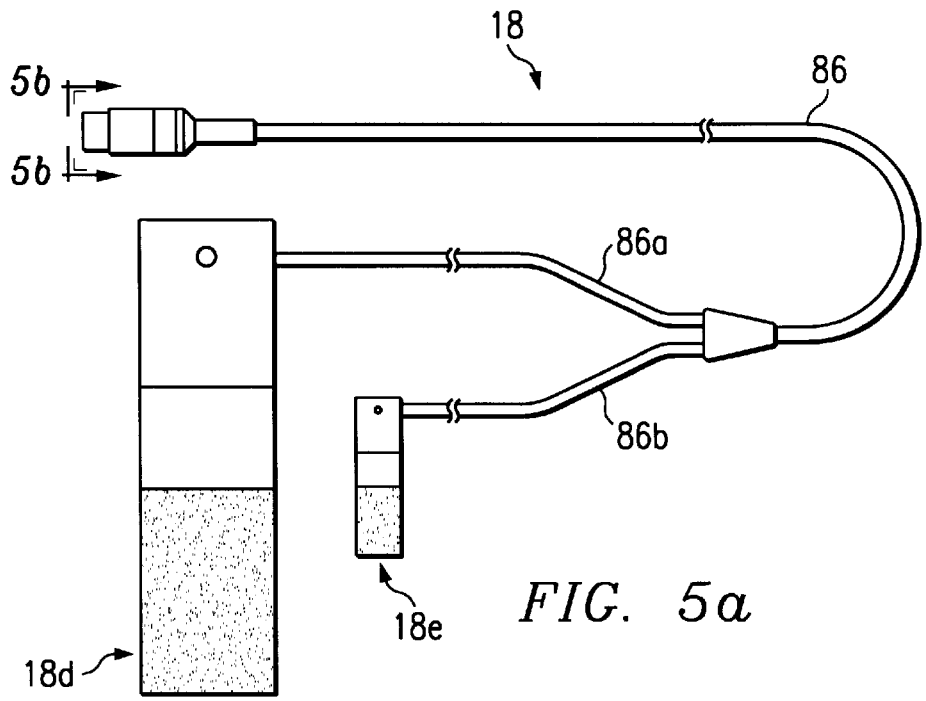
FIGS. 5a–5d illustrate various views of a blood pressure cuff and a finger cuff for use with the system of FIG. 2.
Figure 5C:
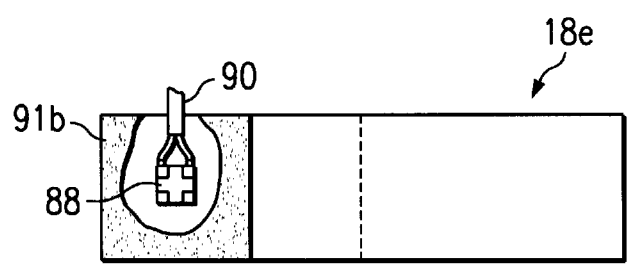
Figure 5B:
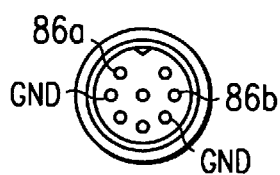
Figure 5D:
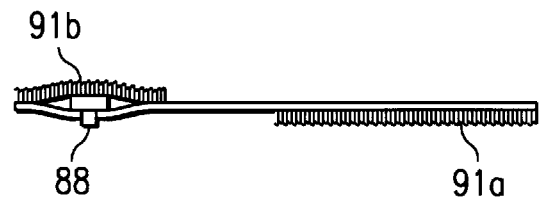

FIGS. 5a–5d illustrate details of the BP cuff 18d and the pulse oximeter finger cuff 18e. The cuffs 18d, 18e are configured together wherein a cable 86 is provided that connects to the BP/OSAT/HEARTRATE port 48 and bifurcates into the respective cuffs. Electrical leads 86a and 86b connected to the respective cuffs 18d and 18e are depicted at one end of the cable 86 in FIG. 5b for connection to the EKG port 48 (FIG. 3). As shown in FIGS. 5c–5d with respect to the finger cuff 18e, a tactile switch 88 connected to a line 90 of the cable 86 is mounted in the finger cuff and is activated to complete a circuit when the cuff is secured properly with velcro (male) 91a and velcro (female) 91b to the finger of the manikin 28. Similar switch circuitry, though not shown, is contained in the BP cuff 18d.

Referring again to FIG. 2, another of the virtual instruments 18 is a temporary external pacer 18f. The pacer 18f connects to the pacer port 50 and includes a cable 92 that bifurcates into two sensing patches 94 and 96. The sensing patches 94, 96 are similar to those described with reference to the EKG monitor sensing patches 70, 72, 74 (FIGS. 4a–4d). Sensor pads 20h, 20i are located on the torso of the manikin 28 in the appropriate locations for receiving the sensing patches 94, 96 and are used in the same manner described previously with respect to the EKG monitor sensing patches 70, 72, 74 to confirm the proper placement of the pacer 18f on the manikin 28 to the CIM 16.

The automatic external defibrillator (AED) 18g connects to the AED port 52 and includes a cable 98 that bifurcates into two sensing patches 100, 102. The sensing patches 100, 102 are similar to those described with reference to the EKG monitor sensing patches 70, 72, 74 (FIGS. 4a–4d). Sensor pads 20j, 20k are located on the torso of the manikin 28 in the appropriate locations for receiving the sensing patches 100, 102 and are used in the same manner described previously with respect to the EKG monitor sensing patches 70, 72, 74 to provide a confirmation to the CIM 16 that the AED 18g is properly placed on the manikin 28.

Referring to FIG. 2 and FIGS. 5e–5j, the sternum and apex manual defibrillators 18h, 18i are connected by lines 104, 106, respectively, to the sternum and apex ports 54, 46, respectively, of the manikin 28. The defibrillators 18h, 18i simulate real defibrillators but do not produce a charge. The defibrillators 18h, 18i include plates 108, 110, respectively, on the bottom surfaces thereof. The plates 108, 110 define respective unequally sized openings 108a, 110a, the opening 110a being larger than the opening 108a. Switches 109, 111 are recessed within the openings 108a, 110a, respectively, so that they are activated upon engagement with switch activators 20j', 20k' protruding from the sensor pads 20j, 20k. The switch activators 20j', 20k' are sized so that they may fit within the openings 108a, 110a, respectively. The activator 20k' is larger than the activator 20j', and accordingly won't fit within the smaller opening 108a, thereby enabling the computer 12 to ascertain whether the defibrillators 18h, 18i are correctly placed on the manikin 28. The defibrillators 18h, 18i include a charge button 112 and a discharge/activation button 114, for simulating the use of actual defibrillator equipment. The CIM 16 confirms correct placement and use of the defibrillators 18h, 18i by insertion of the activators 20j', 20k' in the openings 108a, 110a, resulting in the closure of the switches 109, 111.

FIGS. 6–36 illustrate details the graphical user interface for the system 10. In particular, FIGS. 6–36 illustrate operation of the training program 14 on the computer 12 in cooperation with the sensor-equipped manikin 28, the sensor-equipped virtual instruments 18, and the CIM 16. It should be noted that algorithms incorporated into the program 14 follow BLS and ACLS guidelines set forth by the American Heart Association.

The training program 14 is written in any suitable programming language for operation on a standard PC or other computer 12. While not shown, it is understood that the program 14 is stored on a computer-readable medium, such as a floppy diskette, a CD, or a hard drive, and is executed on the computer 12. The representative screen displays (shown below) of the program 14 are understood to be presented on the display 12c or the monitor 22.

Figure 6:
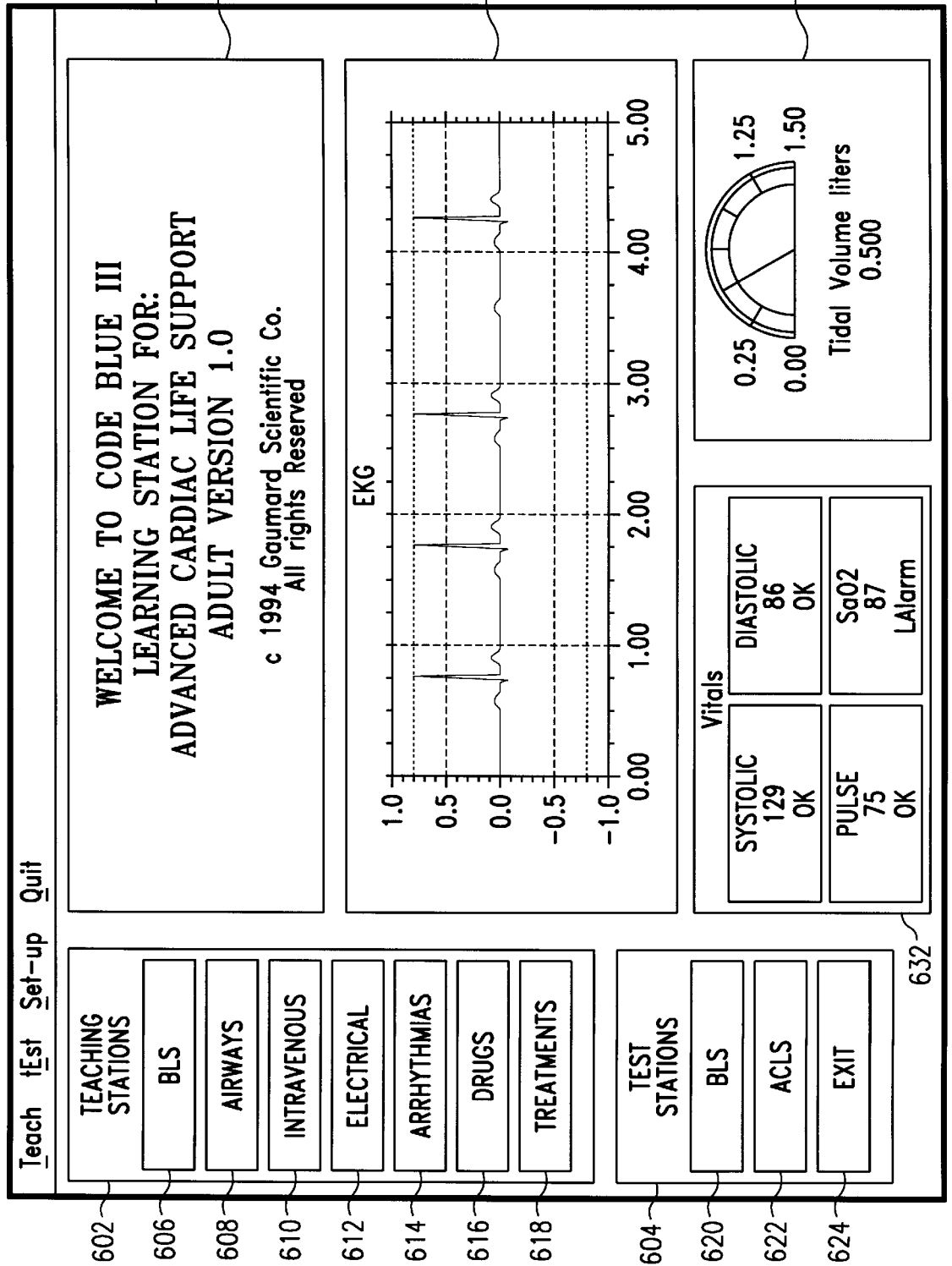
FIG. 6 is a screen display generated by the program of the system of FIG. 1.

FIG. 6 illustrates an introductory screen display 600 of the program 14. The display 600 includes a teaching station selection box 602 and a testing station selection box 604. The teaching station selection box 602 includes a plurality of teaching stations, i.e., modules, 606–618, represented by graphical buttons, any one of which may be selected by the mouse 12b for directing program execution to the teaching module identified on the selected button. Similarly, the testing station selection box 604 includes two testing modules 620, 622 represented by graphical buttons, either of which may be selected by the mouse 12b for directing program execution to the test module identified on the selected button. An exit command button 624, also placed in the testing station selection box 604, may be selected for exiting from the program 14. It is understood that the selection of a button or menu item in the present program may be effected by using the "point-and-click" feature of the mouse 12b, by using an Alt-key combination, or by using any other desired technique that is available. The display 600 also includes a title box 626 as well as three ornamental display boxes 628–632 which are representative of graphical displays provided in subsequent modules of the program, described below.

Figure 7:
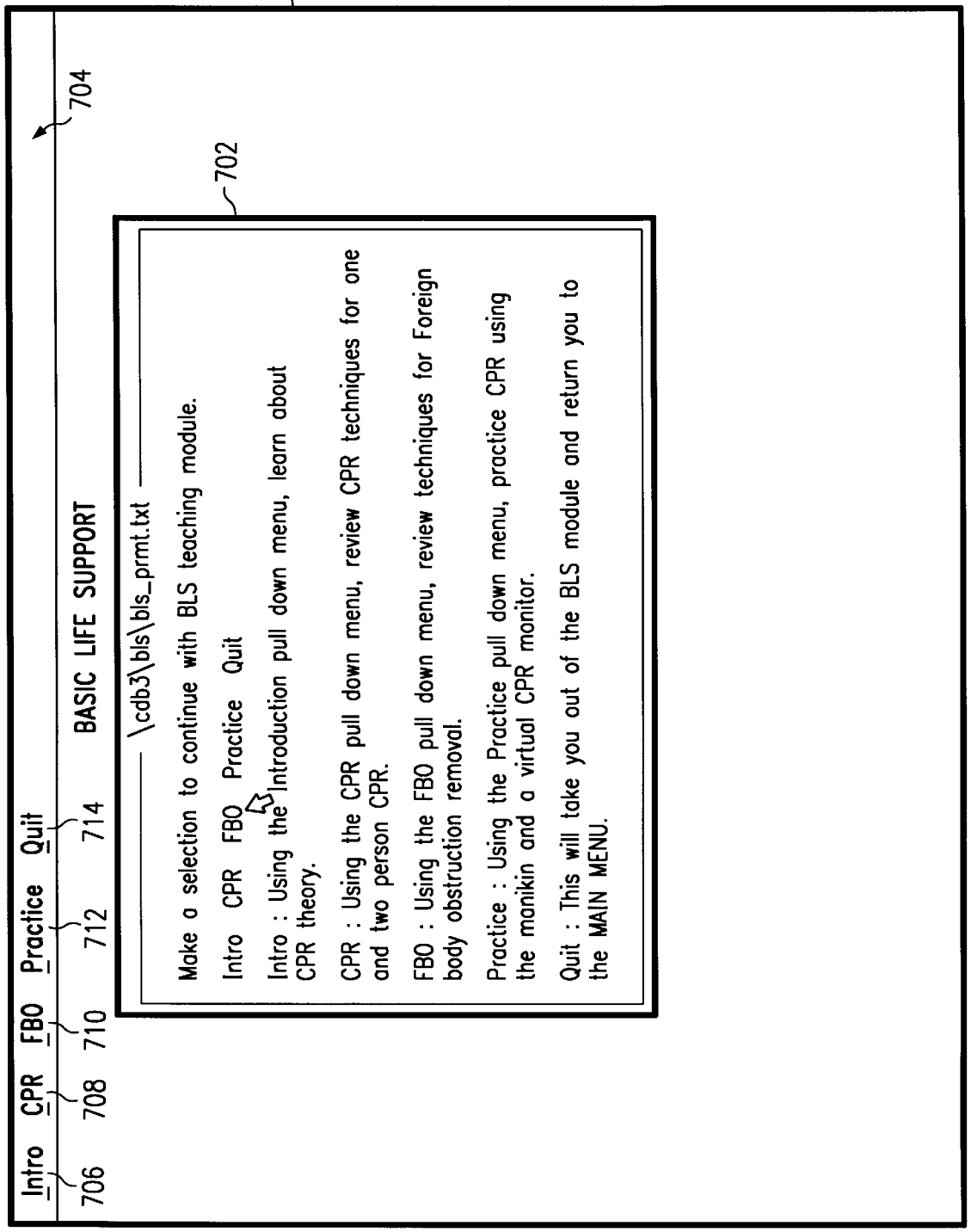
FIG. 7 is a screen display generated upon selection of the BLS module of the display of FIG. 6.

Referring to FIGS. 6 and 7, if the BLS module 606 is selected, then program execution proceeds to display an instruction screen 700, shown in FIG. 7. The display screen 700 includes a text box 702 which describes the BLS module 606, and a menu bar 704 which includes a number of menu items 706–714, any one of which may be selected for directing further execution of the program 14.

Figure 8:
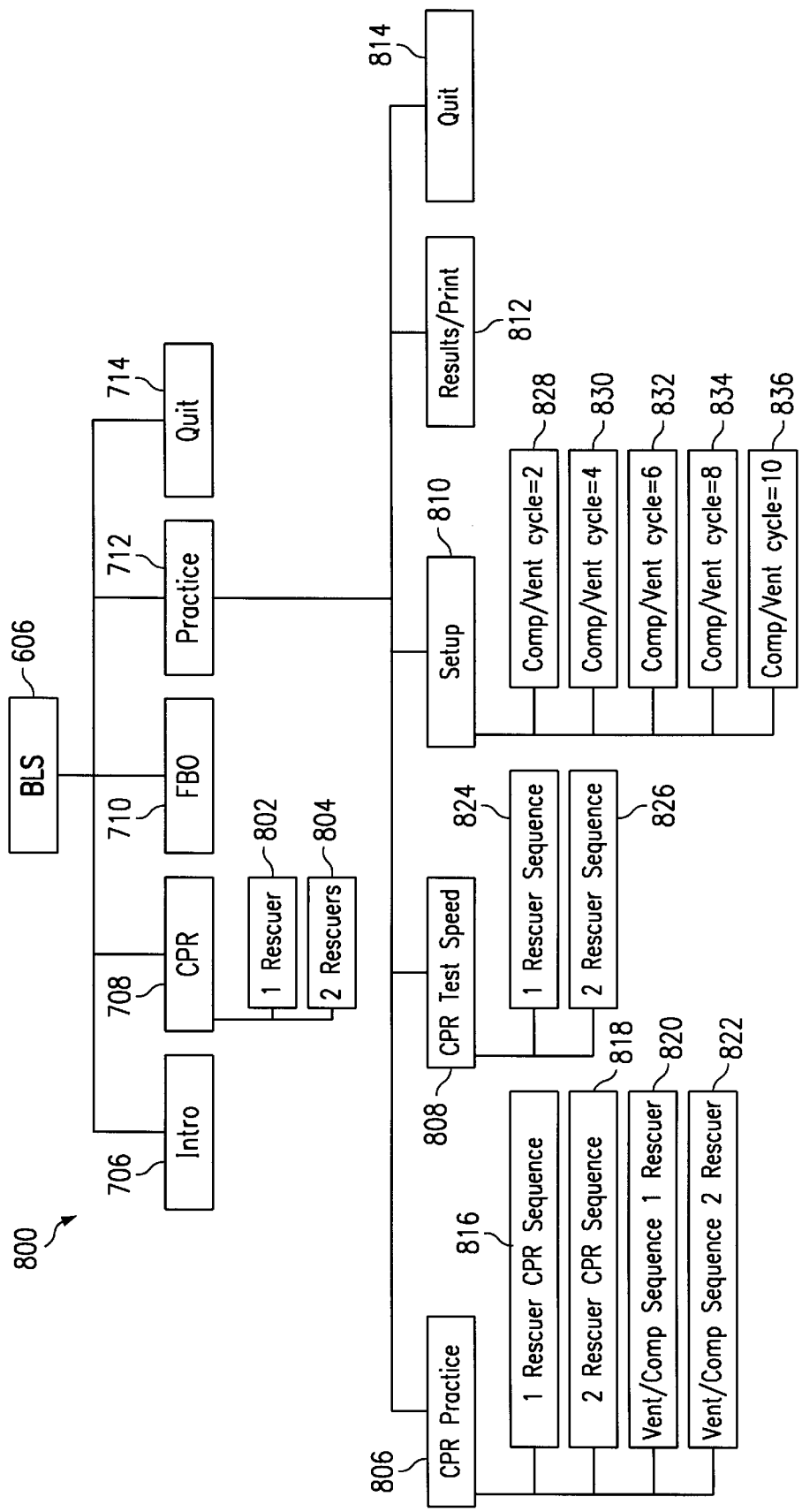
FIG. 8 is a screen display of a decision tree of available menu items of the BLS module of FIG. 7.
Figure 11:

FIG. 8 illustrates a decision tree structure 800 followed by the BLS module 606. The available menu items include an Intro (i.e., an Introduction) item 706, a CPR item 708, an FBO (i.e., a Foreign Body Obstructions) item 710, a Practice item 712, and a Quit command item 714. Selection of the Intro item 706 displays a BLS introduction screen 900 and a text box 902 as shown in FIG. 9.

Referring to FIGS. 7–12, upon selection of the CPR item 708, the user is prompted with items 802 and 804 for requesting a CPR action sequence with one or two rescuers, respectively. Upon the selection of item 802 or 804, the program 14 displays a CPR introductory screen 1000 and text box 1002 as shown in FIG. 10. Three command buttons 1004, 1006, 1008 are provided at the bottom of the screen 1000 for allowing a user to proceed back to a previous screen, to proceed forward to a next screen, or to exit from the BLS module 606, respectively. Subsequent screens display sequential actions which integrate the basic concepts of CPR, and include graphical images such as the image 1100 shown in FIG. 11.

Selection of the FBO item 710 (FIG. 8) directs the program 14 to display techniques for dealing with foreign body obstructions (FBO).

Selection of the Practice item 712 directs execution of the program 14 to provide a selection of Practice menu items 806–814, as shown. Upon selection of the CPR Practice item 806, the user may select among a plurality of action sequences 816–822, to receive training in CPR with one rescuer, CPR with two rescuers, or CPR ventilation/compression techniques with one rescuer, or with two rescuers, respectively. The CPR test speed practice menu item 808 prompts the user to select item 824 or 826 to adjust the speed for an action sequence having either one or two rescuers, respectively. The Setup menu item 810 enables the user to specify that the action sequences 828–836 comprise 2, 4, 6, 8, or 10 compression/ventilation cycles, respectively.

Figure 12:
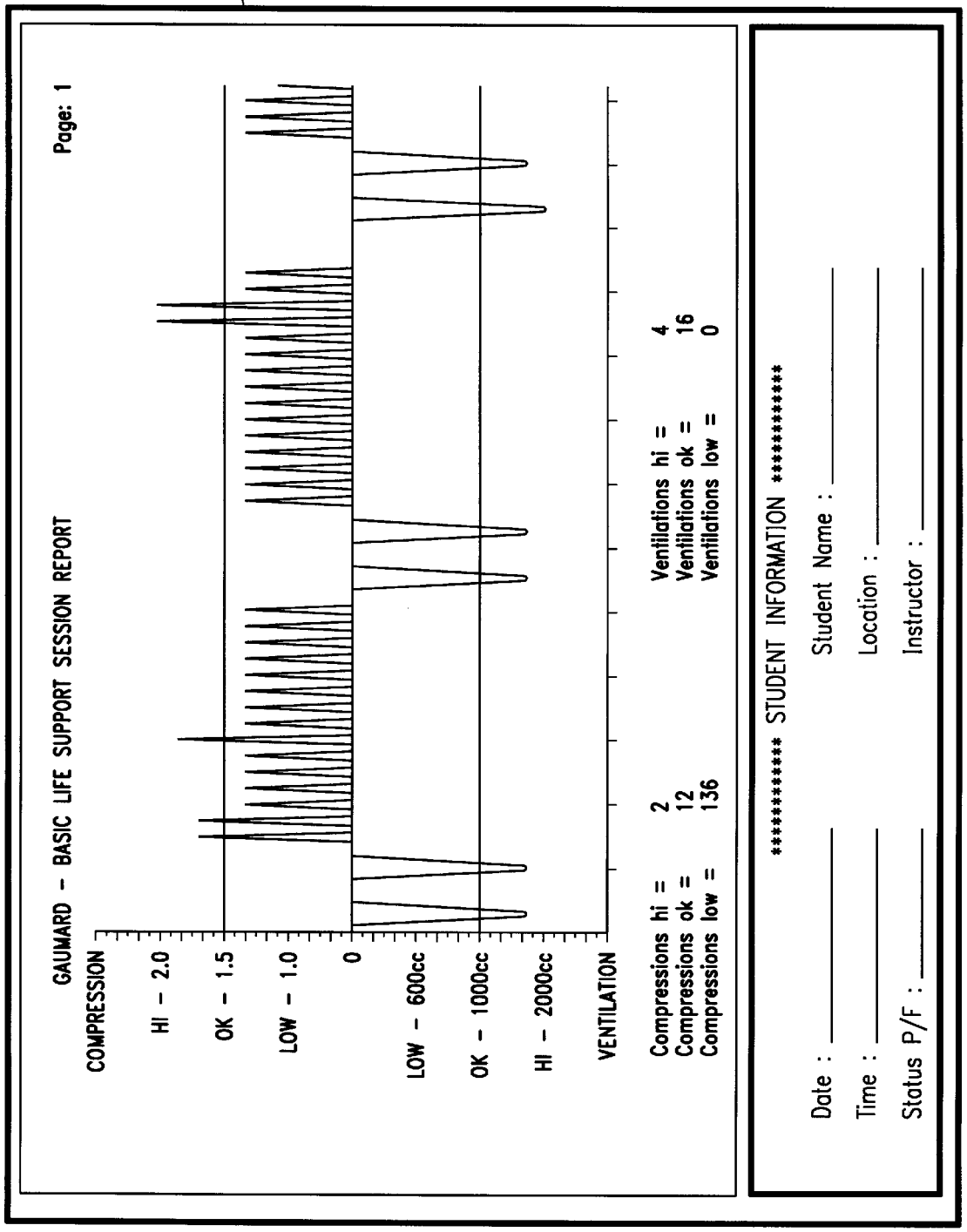

The Results/Print practice menu item 812 directs the program 14 to record the time and magnitude of the compression and ventilation activity executed by the user on the manikin 28. It can be appreciated that compression and ventilation data is acquired from pressure waves sensed by the CIM 16 through the tubes 62 and 66 when the chest of the manikin 28 is compressed and when air is ventilated in the trachea of the manikin. The recorded results may be displayed, as illustrated by display screen 1200 in FIG. 12, on the display 12c or the display screen 22 or, alternatively, may be printed on the printer 24 to thereby provide a hard copy of the results. As shown in FIG. 12, the results may be readily evaluated to determine whether the compression and/or ventilation actions are high, or low, or are OK. Selection of the Quit item 814 directs the program 14 to exit from the Practice item 712, and selection of the Quit item 714 directs the program to exit from the BLS module 608.

Figure 14:
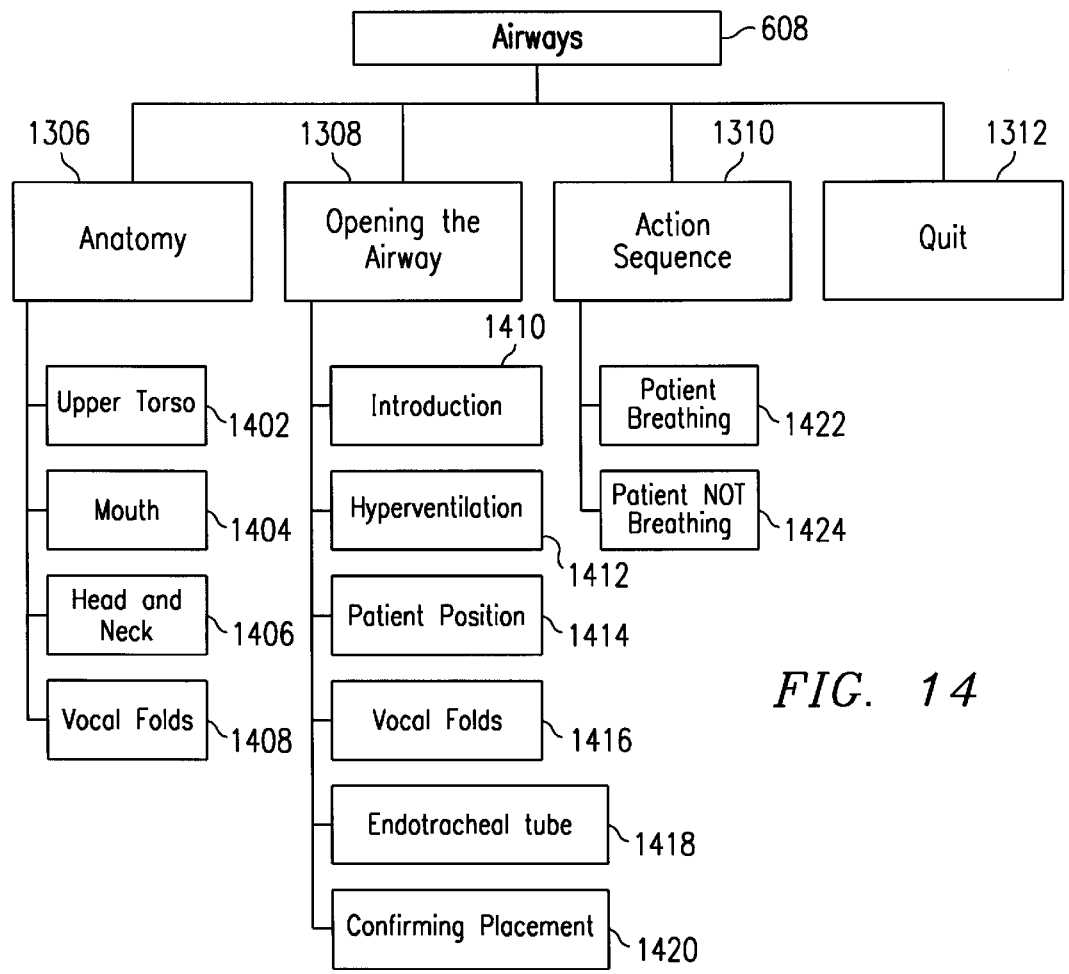
FIG. 14 is a screen display of a decision tree of available menu items of the Airways module of FIG. 13.
Figure 15:
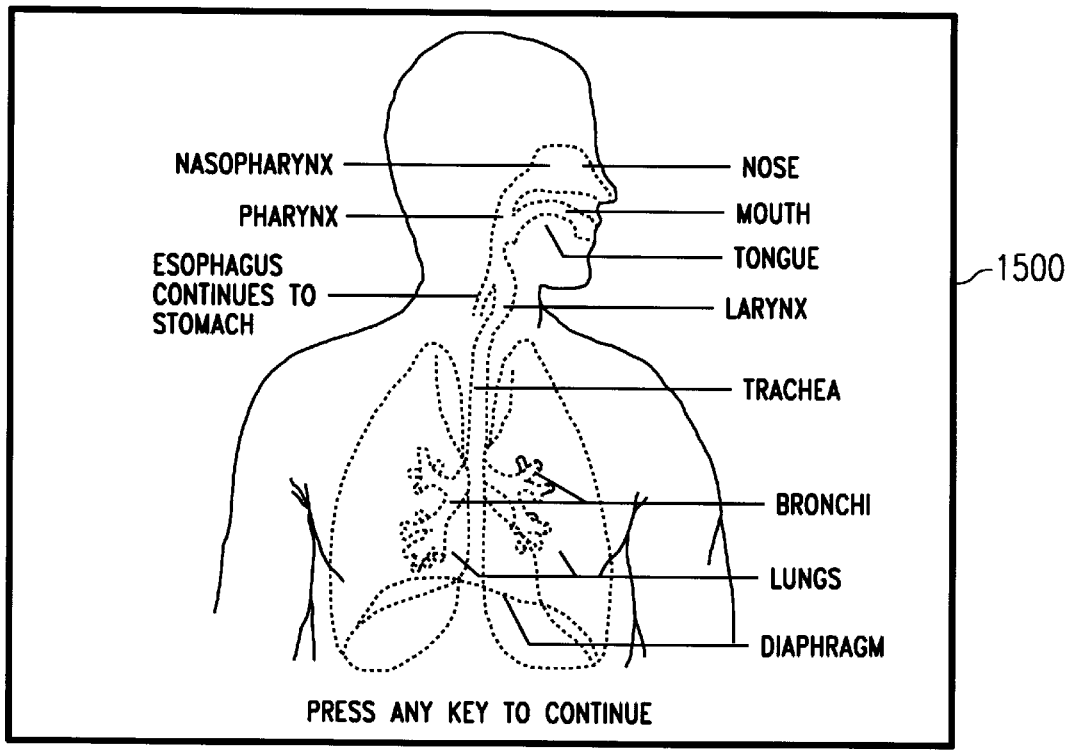
FIGS. 15–16 are representative graphical screen displays generated by the Airways module of FIG. 13.
Figure 16:
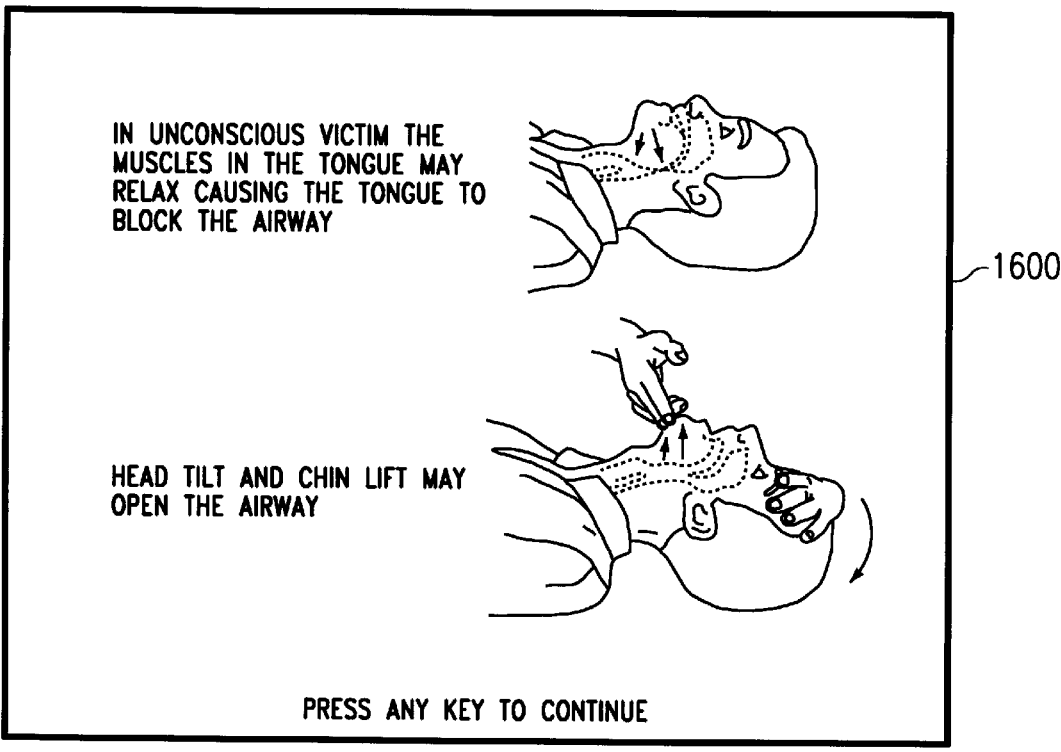

Referring to FIG. 6 and FIGS. 13–16, selection of the Airways module 608 directs execution of the program 14 to a provide information regarding airway techniques. FIG. 13 illustrates a display screen 1300 and text box 1302 with information on opening an airway, for example. A menu bar 1304 includes menu items 1306–1312 directed to Anatomy, Opening the Airway, Action Sequence, and Quit, as shown. FIG. 14 illustrates a menu tree structure of the Airways module 608. The Anatomy item 1306 includes teaching sessions 1402–1408 directed to Upper Torso, Mouth, Head and Neck, and Vocal Cords, respectively. Representative graphics screens 1500 and 1600 pertaining the teaching sessions 1402–1408 are shown in FIGS. 15 and 16, respectively.

The Opening the Airway item 1308 includes teachings sessions 1410–1420 on Introduction, Hyperventilation, Patient Position, Vocal Cords, Endotracheal Tube, and Confirming Placement, respectively. The action sequence item 1310 includes teaching sessions 1422, 1424 on Patient Breathing, and Patient NOT Breathing, respectively. The Quit item 1312 is selected to exit the airways module 608.

Figure 17:
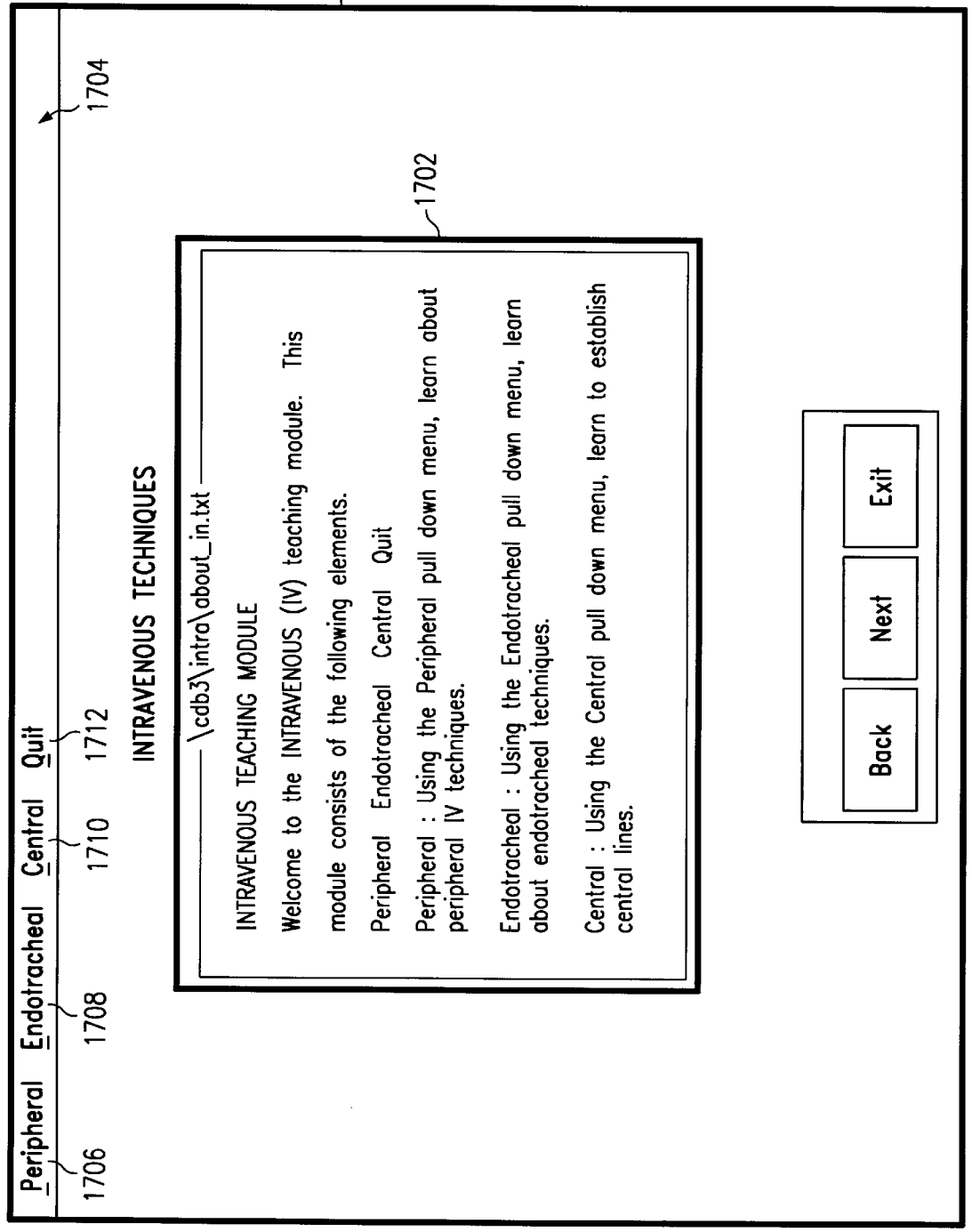
FIG. 17 is a screen display generated upon selection of the Intravenous module of the display of FIG. 6.
Figure 18:
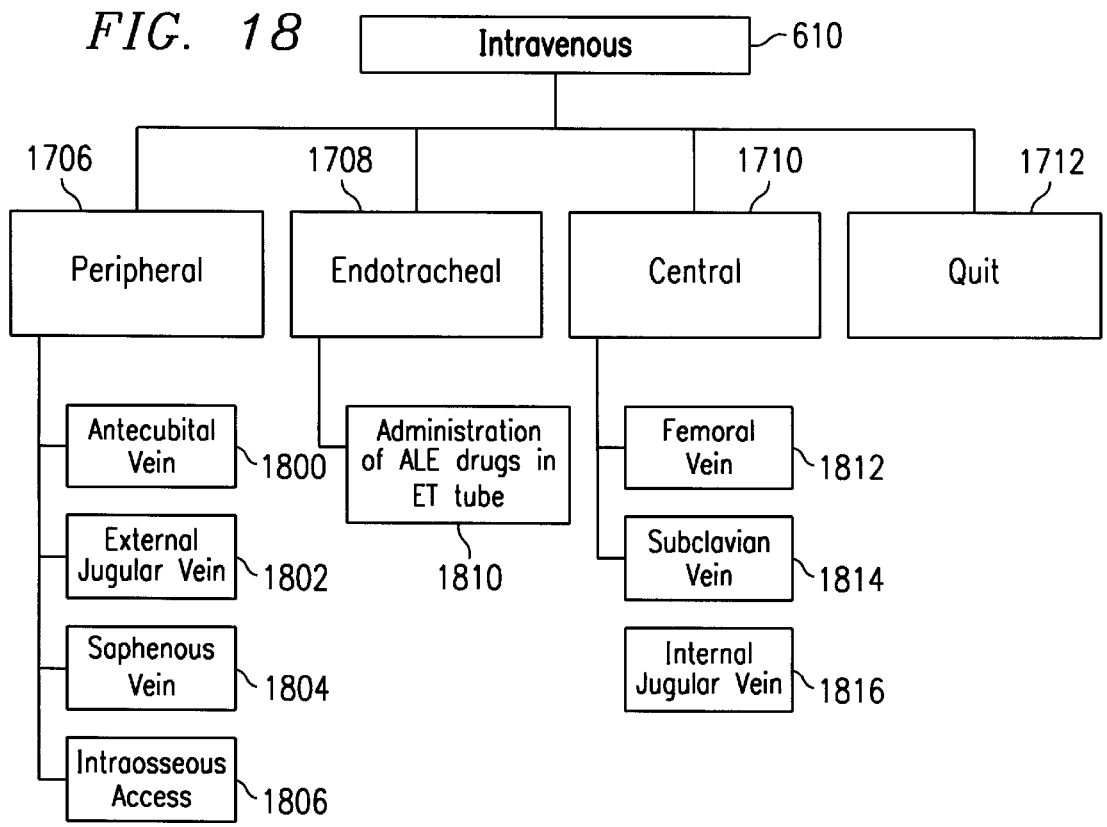
FIG. 18 is a screen display of a decision tree of available menu items of the Intravenous module of FIG. 17.
Figure 19:
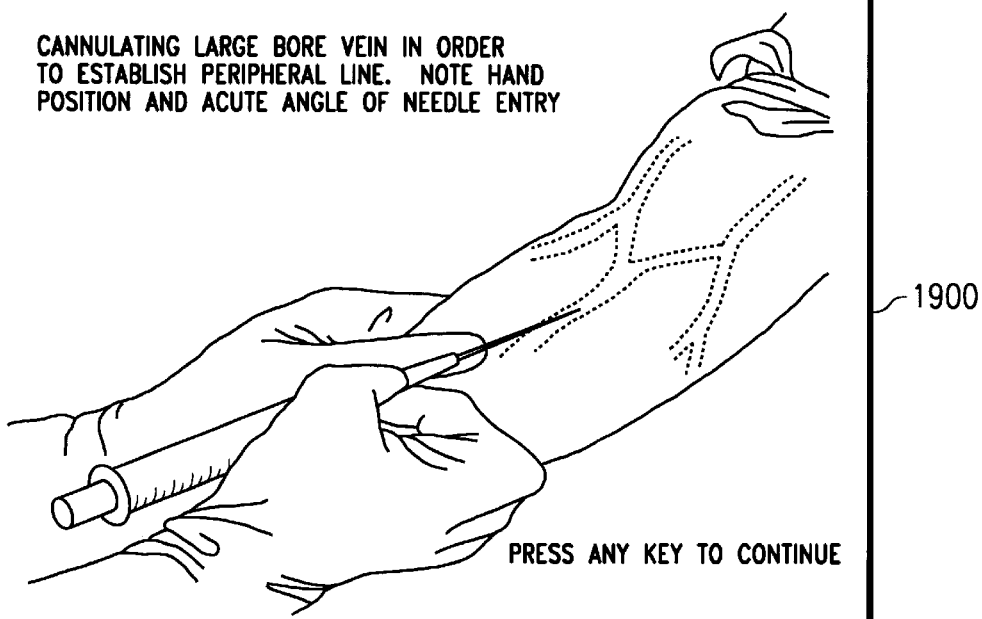
FIG. 19 is a representative graphical screen display generated by the Intravenous module of FIG. 17.

Referring to FIG. 6 and FIGS. 17–19, selection of the Intravenous module 610 directs execution of the program 14 to a provide information regarding intravenous insertion techniques. FIG. 17 illustrates a screen display 1700 with a text box 1702 having information on selecting menu items of the Intravenous module 610. A menu bar 1704 includes menu items 1706–1712 directed to Peripheral, Endotracheal, Central and Quit, respectively. FIG. 18 illustrates a menu tree structure of the Intravenous module 610. The Peripheral item 1706 includes teaching sessions 1800–1806 directed to Antecubital Vein, External Jugular Vein, Saphenous Vein, and Intraosseous Access, respectively. The Endotracheal menu item 1708 includes a teaching session 1810 on the administration of ALE drugs in the ET tube 18b. The Central menu item 1710 includes teaching sessions 1812–1816 on Femoral Vein, Subclavian Vein, and Internal Jugular Vein, respectively. A representative graphic screen display 1900 pertaining the teaching sessions of the Intravenous module 610 is shown in FIG. 19. The Quit item 1712 is selected to direct the program to exit the Intravenous module 610.

Figure 20:
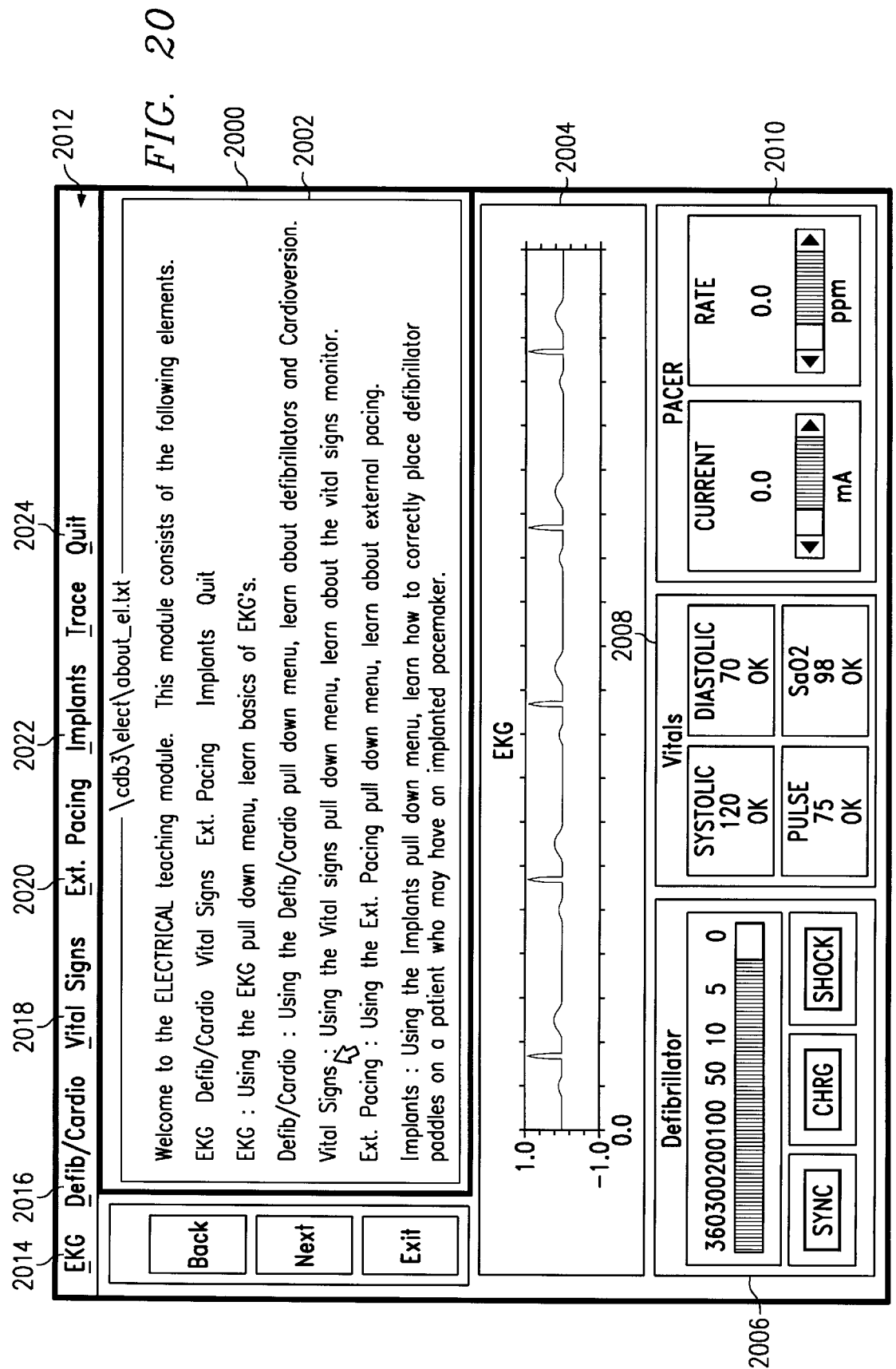
FIG. 20 is a screen display generated upon selection of the Electrical module of the display of FIG. 6.

Referring to FIG. 6 and FIGS. 20–24, selection of the Electrical module 612 directs execution of the program 14 to a screen display 2000, shown in FIG. 20, and text box 2002 having information on selecting menu items of the Electrical module 612. The screen 2000 further includes virtual instrument boxes 2004–2010 pertaining to virtual instruments that include an EKG monitor 18c, a defibrillator 18h, 18i, a vitals monitor, and a pacer 18f, respectively. It is understood that these virtual instruments may be controlled/operated by the mouse 12b for simulating patient care activity in connection with the module 612.

Figure 21:
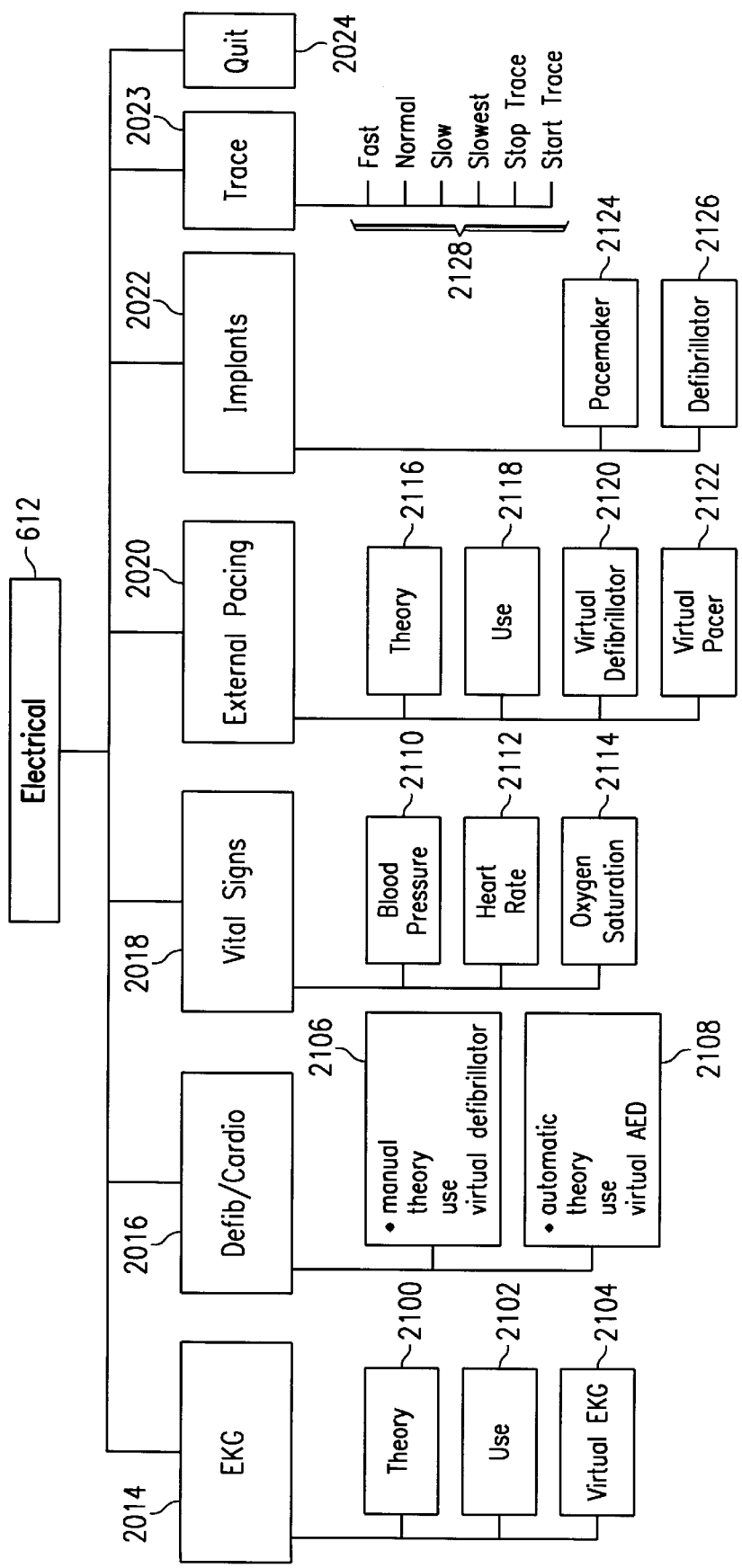
FIG. 21 is screen display of a decision tree of available menu items of the Electrical module of FIG. 20.
Figure 22:
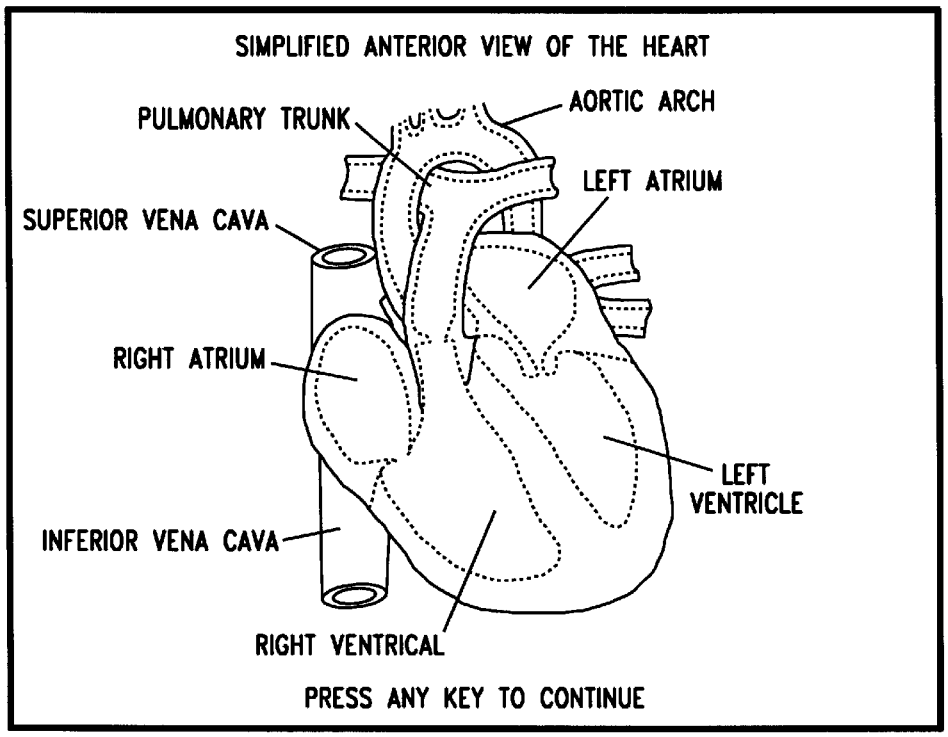
FIGS. 22–24 are representative graphical screen displays generated by the Electrical module of FIG. 20.
Figure 23:
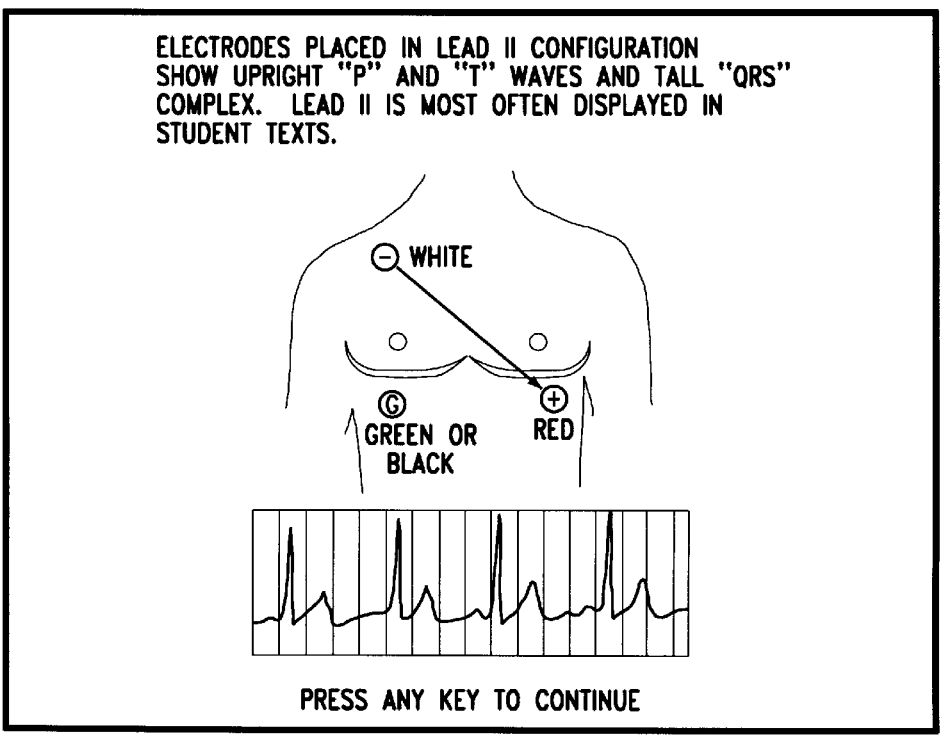
Figure 24:
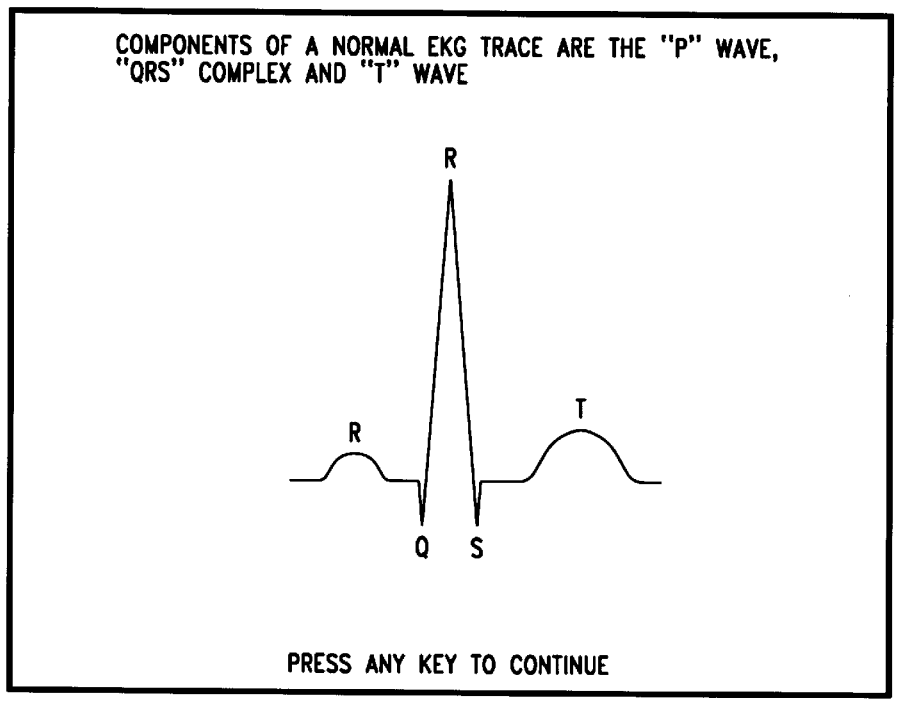

A menu bar 2012 includes menu items 2014–2024 directed to EKG, Defib/Cardio, Vital Signs, Ext. Pacing, Implants, Trace, and Quit, respectively. FIG. 21 illustrates a menu tree structure of the Electrical module 612. The menu items 2014–2022 include teaching sessions 2100–128 as shown. Representative graphic screens 2200–2400 pertaining the teaching sessions of the Electrical module 612 are shown in FIGS. 22–24. Quit item 2024 is selected to direct the program 14 to exit from the Electrical module 612.

Figure 25:
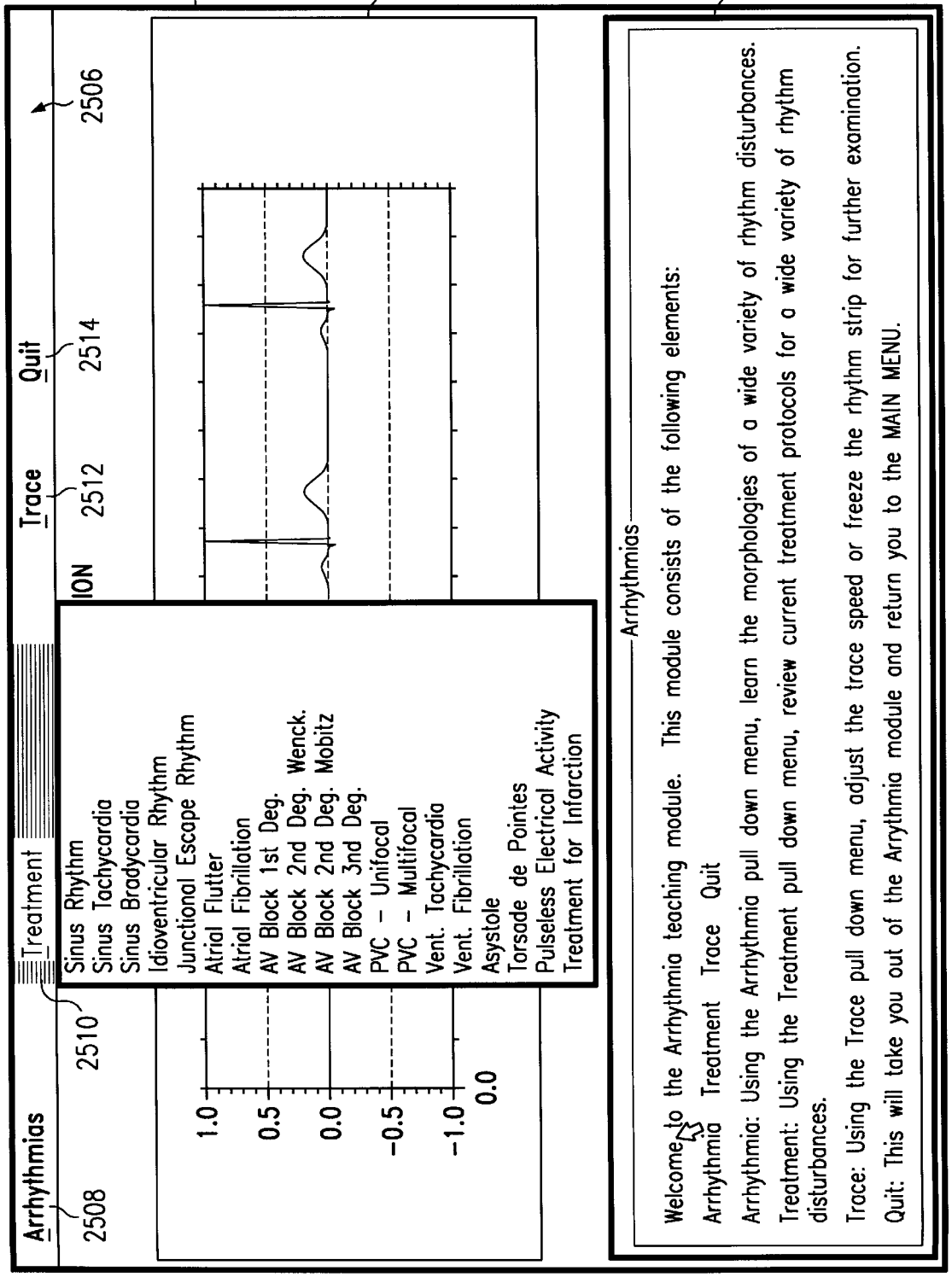
FIG. 25 is a screen display generated upon selection of the Arrhythmias module of the display of FIG. 6.
Figure 26:
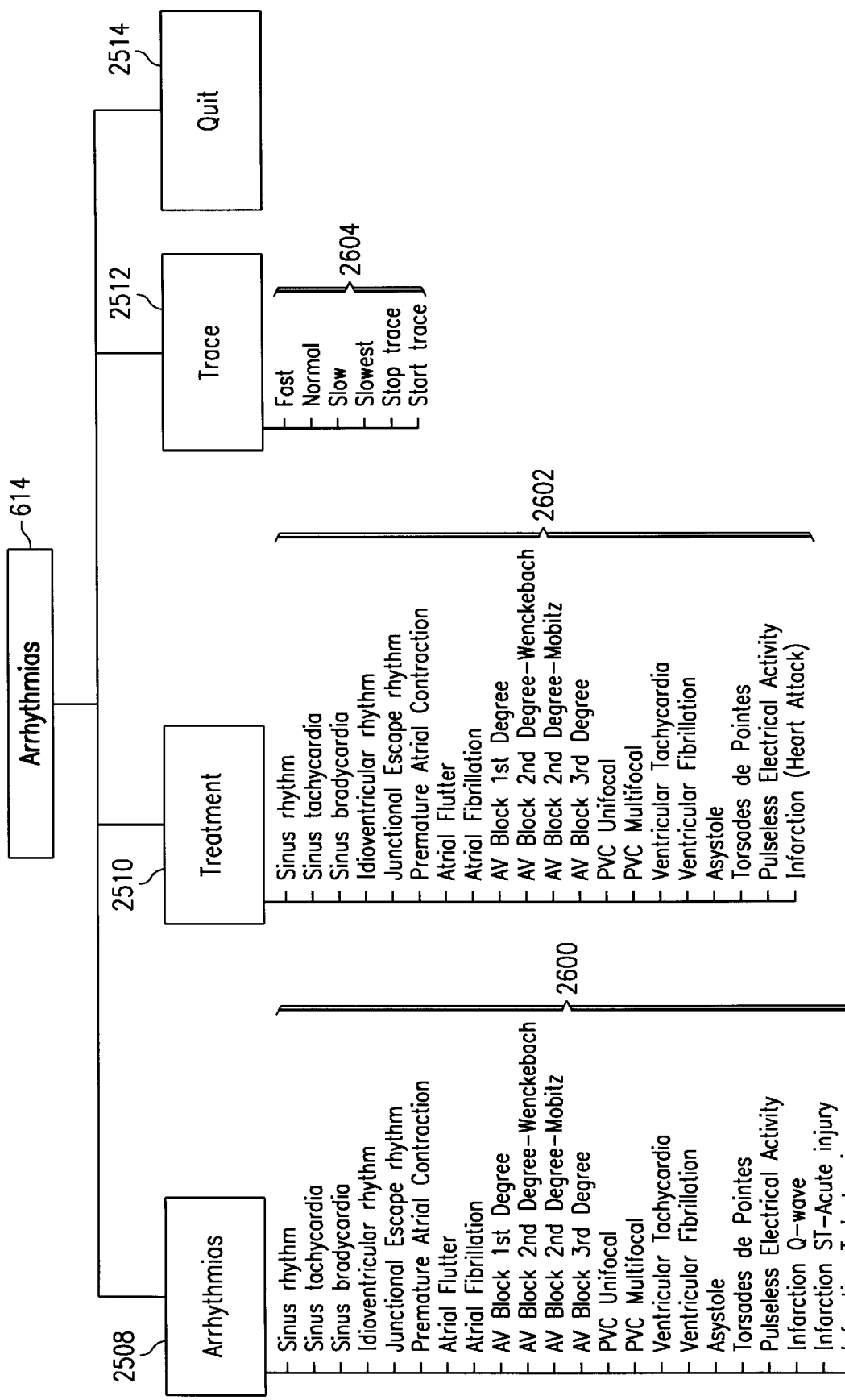
FIG. 26 is a screen display of a decision tree of available menu items of the Arrhythmias module of FIG. 25.

Referring to FIG. 6 and FIGS. 25–26, selection of the Arrhythmias module 614 directs execution of the program 14 to a provide information regarding arrhythmia morphologies. FIG. 25 illustrates a screen 2500 with a text box 2502 having information pertaining to the selection of menu items available with the Arrhythmias module 614. The screen 2500 further includes an EKG trace box 2504 pertaining to example traces of arrhythmias described in teaching sessions.

A menu bar 2506 includes menu items 2508–2514 directed to Arrhythmias, Treatment, Trace, and Quit, respectively. FIG. 26 illustrates a menu tree structure of the Arrhythmias module 614. The menu items 2508 and 2510 include a number of teaching sessions 2600 and 2602 as show in FIG. 26. Selection of the Quit item 2514 directs the program 14 to exit from the Arrhythmias module 612.

Figure 27:
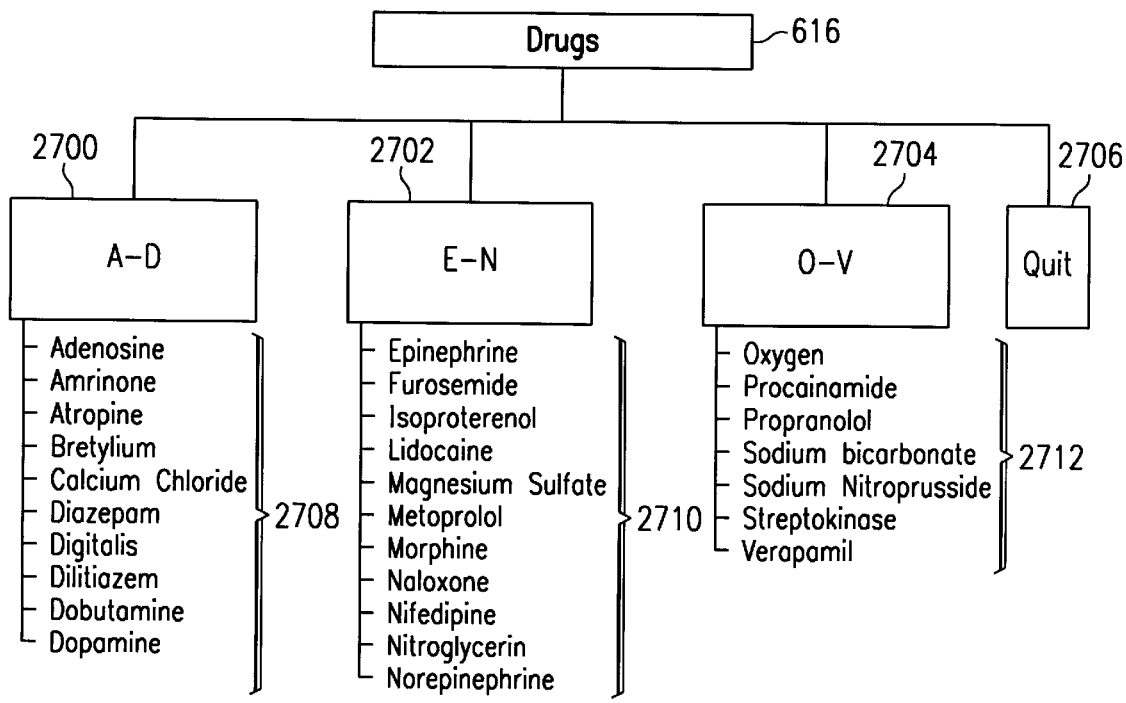
FIG. 27 is a screen display of a decision tree of available menu items of the Drugs module of FIG. 6.

Referring to FIG. 6 and FIGS. 27–28, selection of the Drugs module 616 directs execution of the program 14 to provide information regarding drugs. FIG. 27 illustrates a menu tree structure of the Drugs module 616. The Drug module describes under the menu items 2700, 2702, and 2704, the dosage, indications, uses, actions, side effects, and precautions of a number of drugs 2708, 2710, 2712, respectively, categorized alphabetically as shown in FIG. 27. A typical screen display 2800 and text box 2802 for a selected drug is shown in FIG. 28. Selection of the Quit item 2706 directs the program 14 to exit from the Drugs module 616.

Figure 30:
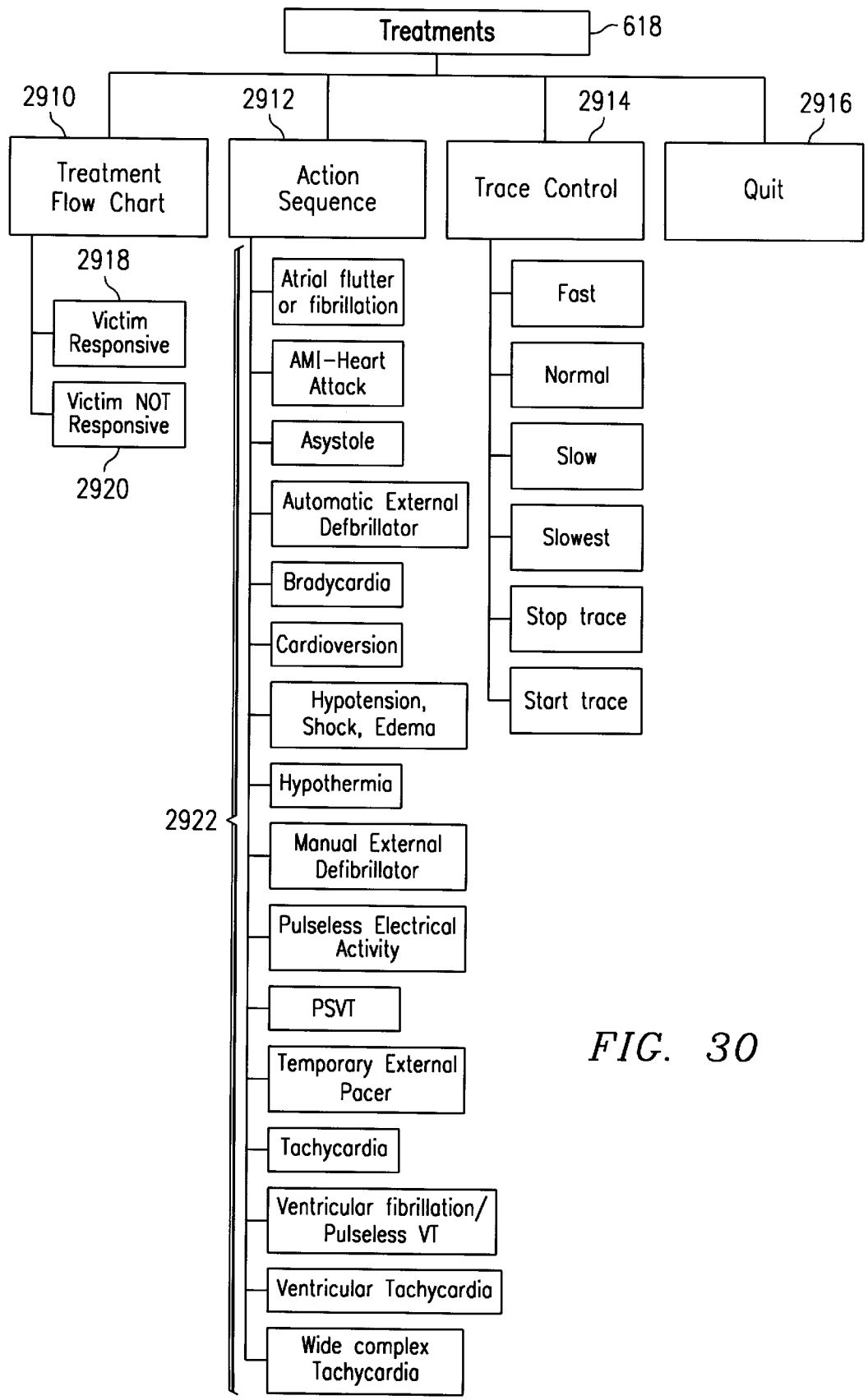
FIG. 30 is a screen display of a decision tree of available menu items of the Treatments module of FIG. 29.

Referring to FIG. 6 and FIGS. 29–30, selection of the Treatments module 618 directs execution of the program 14 to provide information regarding treatment action sequences. FIG. 29 illustrates a display screen 2900 with a text box 2902 having information pertaining to the selection of menu items available with the Treatments module 618. The screen 2900 further includes virtual instrument boxes 2004 and 2006 pertaining to virtual instruments that include the EKG monitor 18c and a vitals monitor, respectively. It is understood that these virtual instruments may be controlled/operated by the mouse 12b for simulating patient care activity in connection with the module 618.

A menu bar 2908 includes menu items 2910–2916 directed to Treatment, Action Sequence, Trace Control, and Quit, respectively. FIG. 30 illustrates a menu tree structure of the Treatments module 618. Selection of the menu item 2910 enables the user to select items 2918 or 2920 for directing the program 14 to simulate a victim that is either responsive or not responsive, respectively. Selection of the menu item 2912 enables the user to select any of a number of treatments 2922 as shown in FIG. 30. Selection of the Trace item 2914 enables a user to specify the speed of a simulated EKG monitor. Selection of the Quit item 2916 directs the program 14 to exit from the Treatments module 618.

Figure 31:
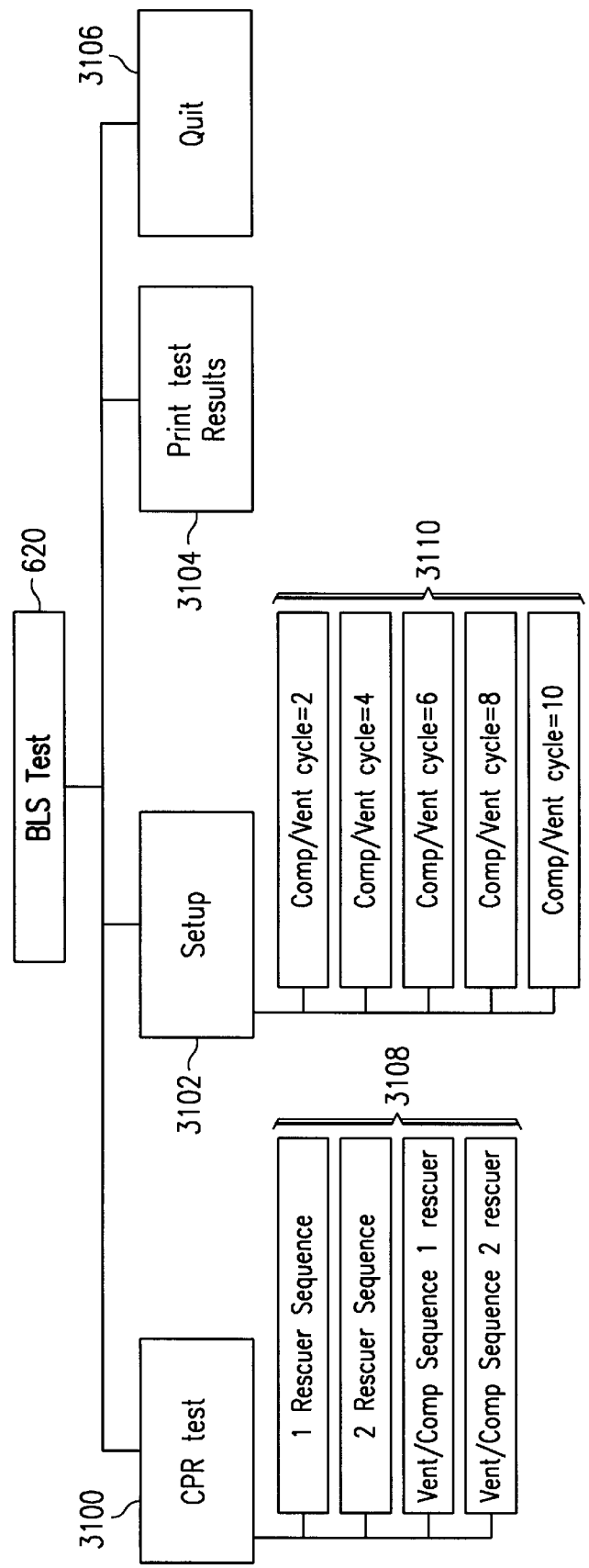
FIG. 31 is a screen display of a decision tree of available menu items of the BLS Test module of FIG. 6.
Figure 32:
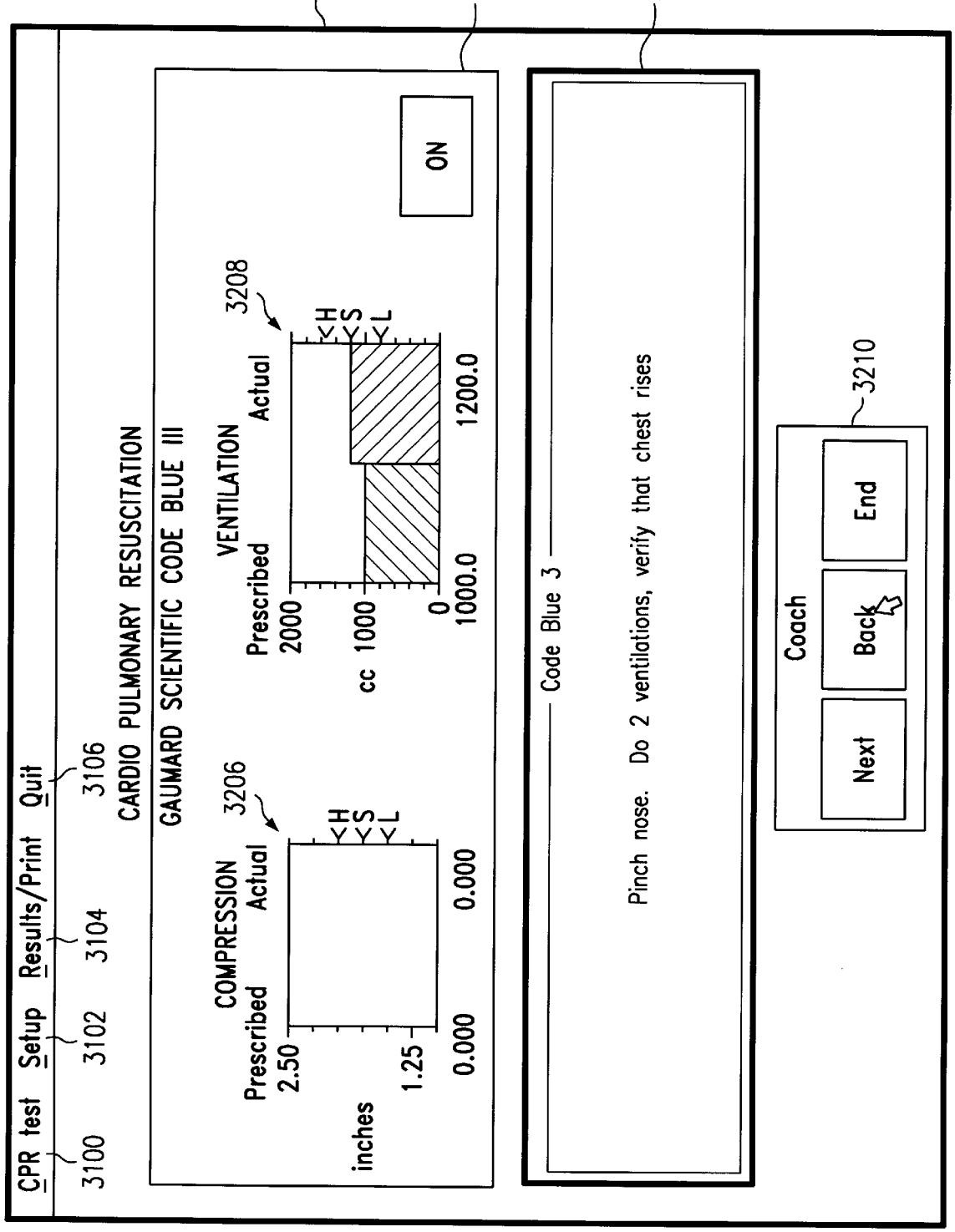
FIG. 32 is a representative screen display generated by the BLS Test module of FIG. 31.

Referring to FIG. 6 and FIGS. 31–32, selection of the BLS Test module 618 directs execution of the program 14 to test the user on CPR techniques. Upon selection of the BLS Test item 620, the user may select among a plurality of action sequences 3108 to be tested in CPR with one rescuer, CPR with two rescuers, or CPR ventilation/compression techniques with one rescuer, or with two rescuers. The Setup menu item 3102 includes selectable items 3110 for enabling the user to specify that the action sequences 3108 comprise 2, 4, 6, or 8 compression/ventilation cycles, respectively.

The Print test Results menu item 3104 directs the program 14 to record the time and magnitude of the compression and ventilation activity executed by the user on the manikin 28. It can be appreciated that compression and ventilation data is acquired from pressure waves sensed by the CIM 16 through the tubes 62 and 66 when the chest of the manikin 28 is compressed and when air is ventilated in the trachea of the manikin. The recorded results may be displayed, similarly as shown by the display screen 1200 (FIG. 12), on the display 12c or the display screen 22 or, alternatively, may be printed on the printer 24 to thereby provide a hard copy of the results. As shown in FIG. 12, the results may be readily evaluated to determine whether the compression and/or ventilation actions are high, or low, or are OK.

FIG. 32 shows a representative display screen 3200 that is generated by the program 14 when one of the menu items 3108 are selected. The screen 3200 includes a text box 3202 which displays information indicating what action would be executed in a sequence of actions. A virtual instrument graphics box 3204 includes a compression monitor 3206 (not activated in FIG. 32) for displaying, in a comparative bar chart manner, a prescribed CPR chest compression, and an actual compression which is sensed by the CIM 16 from a pressure reading derived from the bladder 64 via the pressure line 66. The graphics box 3204 also includes a ventilation monitor 3208 for displaying, in a comparative bar chart manner, a prescribed CPR tracheal ventilation, and an actual ventilation which is sensed by the CIM 16 from a pressure reading derived from the pressure line 62. A "coach" command box 3210 is used to sequence the user backward or forward the steps of the scenario for repeating or performing the patient care activities at the user's own pace. Otherwise, it is understood that the scenario, once started, paces through the steps of the scenario by displaying the action sequence instructions in the box 3202 and giving the user a predetermined time (with audio as well as visual prompts) to complete the task required, whereupon the next step in the sequence is then presented to be performed. Thus the user is able to experience the time pressure of an actual "Code" situation according to the scenario by performing the activities on the manikin 28 such that the system 10 senses when the activities are being performed correctly and the user is prompted accordingly. Selection of the end item in the box 3210 ends the session or possibly is programmed to end just the coaching session whereby execution then proceeds to the timed scenario. The Quit item 3106 directs the program 14 to exit from the BLS Test module 620.

Figure 33:
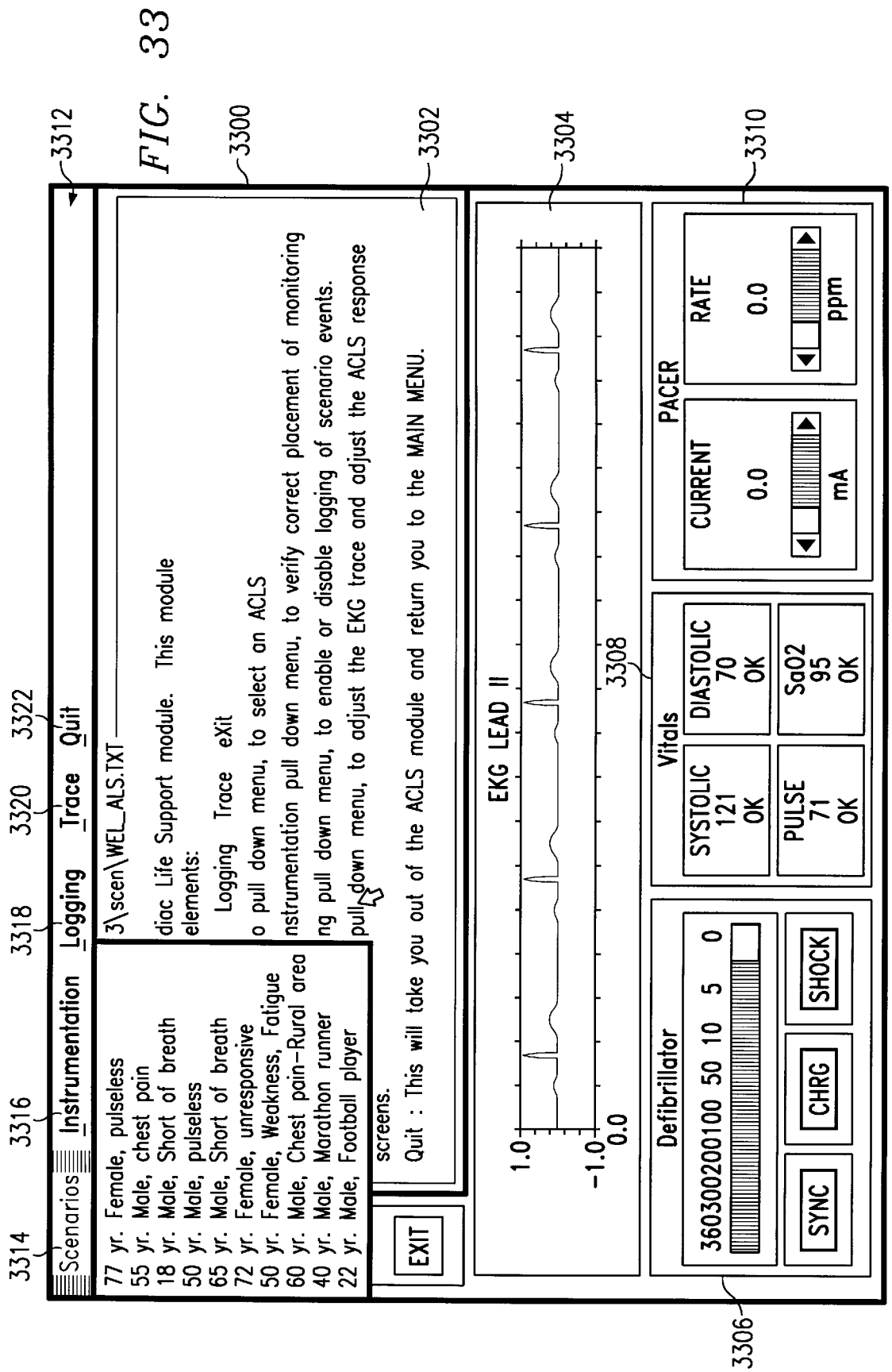
FIG. 33 is a screen display generated upon selection of the ACLS module of the display of FIG. 6.

Referring to FIG. 6 and FIGS. 33–35, selection of the ACLS module 622 directs execution of the program 14 to test the user on ACLS techniques. FIG. 33 illustrates a display screen 3300 with a text box 3302 having information pertaining to the selection of menu items available with the ACLS module 622. The screen 3300 farther includes virtual instrument boxes 3304, 3306, 3308, 3310 pertaining to virtual instruments that include computer generated representations of the EKG monitor 18c, the manual defibrillators 18h, 18i, a vitals monitor, and a pacer 18f, respectively. It is understood that these virtual instruments may be controlled/operated by the mouse 12b for simulating patient care activity in connection with the module 622. A menu bar 3312 includes menu items 3314–3322 directed to Scenarios (shown selected), Instrumentation, Logging, Trace, and Quit, respectively.

Figure 34:
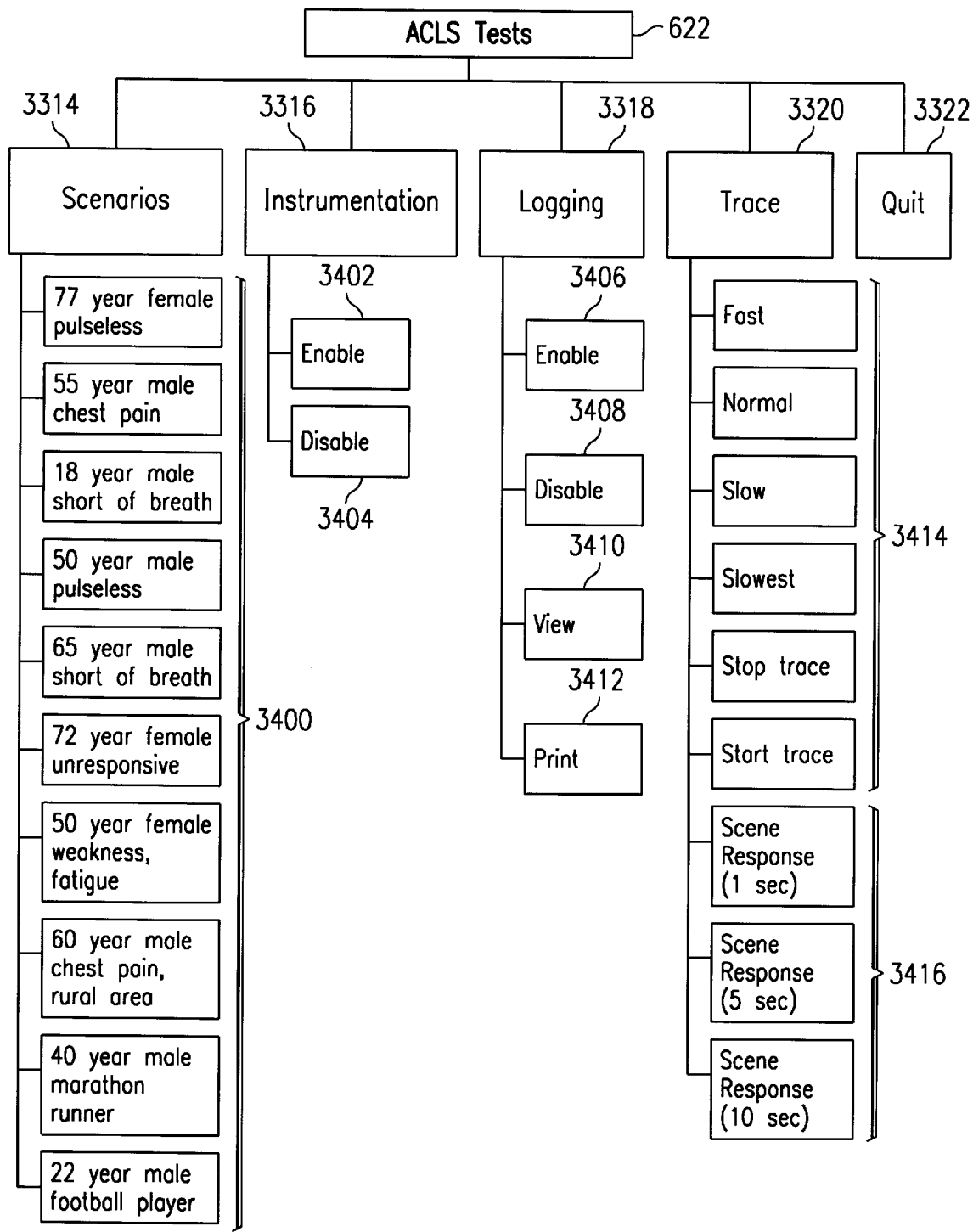
FIG. 34 is a screen display of a decision tree of available menu items of the ACLS module of FIG. 33.

FIG. 34 illustrates a menu tree structure of the ACLS module 622. Selection of the Scenarios item 3314 enables the user to select any one of a number of different victim scenarios 3400. The Instrumentation item 3316 enables the user, by further selecting items 3402 or 3404, to enable or disable the virtual instruments 18 and sensors 20 that supply input from the manikin 28 to the CIM 16.

Selection of the Logging item 3318 and the Enable item 3406 directs the program 14 to record the time and magnitude of the compression and ventilation activity executed by the user on the manikin 28. Logging may be disabled by selecting the item 3408. It can be appreciated that compression and ventilation data is acquired from pressure waves sensed by the CIM 16 through the tubes 62 and 66 when the chest of the manikin 28 is compressed and when air is ventilated in the trachea of the manikin. The recorded results may be viewed, by selecting the View item 3410, similarly as shown by the display screen 1200 (FIG. 12), on the display 12c or the display screen 22 or, alternatively, may be printed, by selecting the print item 3412, on the printer 24 to thereby provide a hard copy of the results. As shown in FIG. 12, the results may be readily evaluated to determine whether the compression and/or ventilation actions are high, or low, or are OK.

Selection of the Trace item 3320 enables the user to select an item 3414 for controlling the speed of an EKG trace generated and displayed on the EKG virtual instrument screen 3304, and to select an item 3416 for adjusting the length of time that a screen appears in the scenarios. Selection of the Quit item 3322 directs the program 14 to exit from the ACLS module 622.

Figure 35:
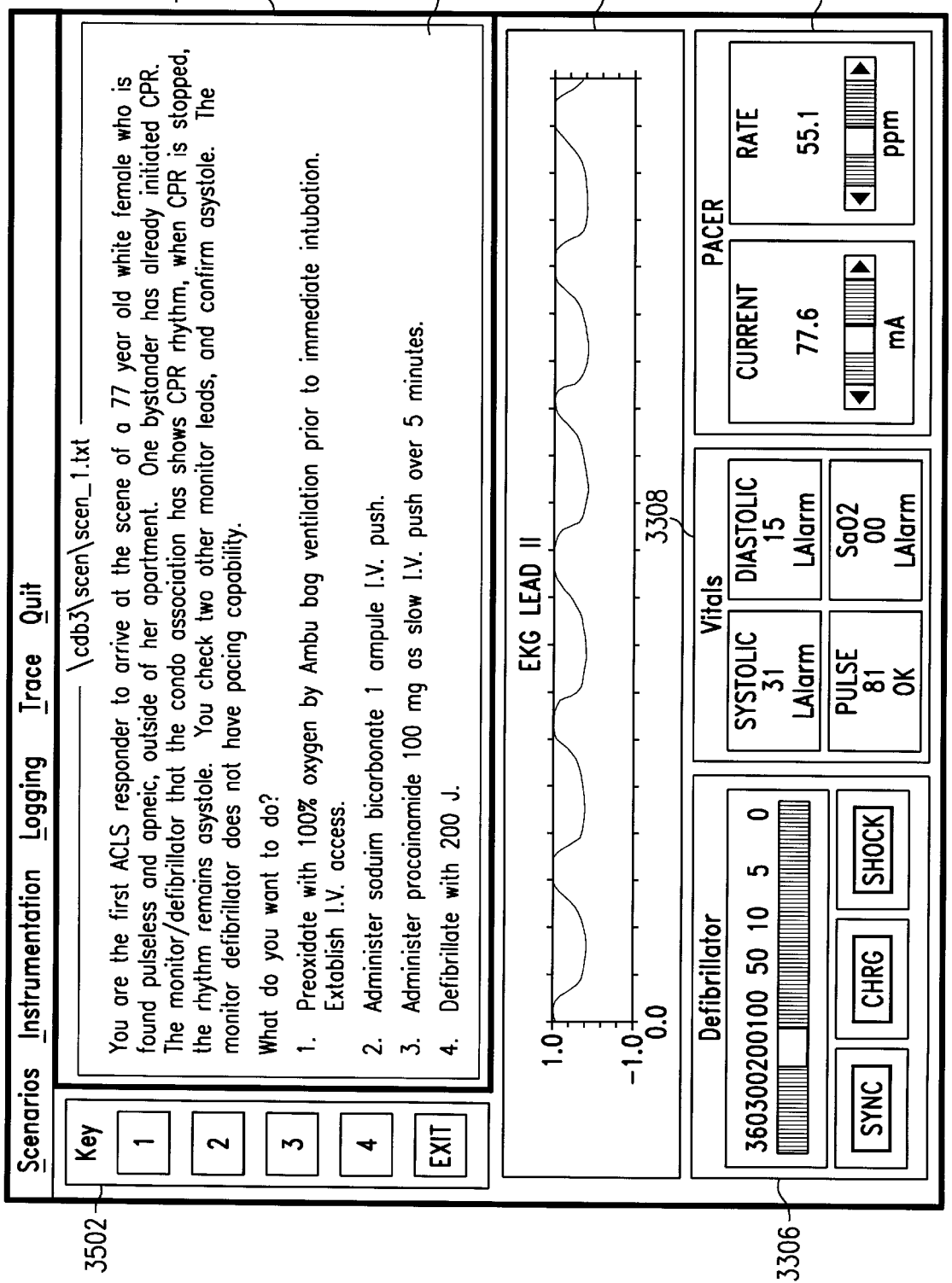
FIG. 35 is a representative screen display generated by the module of FIG. 33.

In FIG. 35, with reference to a display screen 3500 of the ACLS module 622, there is shown an example of the operation of the program 14. The display screen 3500 shows the first screen that is displayed upon selection from the screen 3300 of the menu item 3322 (FIG. 34) test scenario involving a 77 year old pulseless female victim scenario. The text box 3500 describes details of the selected scenario and the EKG monitor 3304 and vital signs monitor 3308 supplement the text box with the victim's EKG trace and vital signs. The text box 3500 also offers test questions in the form of four possible choices from which the user may choose to treat the victim. Four keys 3502, numbered 1–4, are provided for the user to enter one or more of the four offered choices of an action to follow in treating the victim. Action may also be implemented on the manikin 28, particularly when the instrumentation 3316 is enabled (item 3324). In a test situation where the user desires to perform the patient activity without using the virtual instruments 18 on the manikin 28 but instead wants to use computer-generated virtual instruments, the defibrillator 3306 and pacer controls 3310 may be utilized if necessary to further supplement the action taken by the user. The result of any action is reflected in the EKG monitor 3304 and in the vital signs monitor 3308, as well as in the text box 3302. Following an incorrect choice or action, an explanation is provided in the text box 3302 of why such choice or action was incorrect. Following each correct choice and action, the program 14 advances the selected scenario, e.g., until the victim recovers. The user must complete the correct choice, and in some instances properly perform the necessary activity, before the scenario proceeds to the next event. As with the BLS test module 620, the testing session allows for timed scenarios where the user must perform the activities correctly on the manikin 28, as confirmed by the program 14 through the CIM 16, in accordance with accepted protocols.

It is understood that several variations may be made in the foregoing without departing from the scope of the invention. For example, the system 10 may be modified and adapted for training in pediatric advanced life support (PALS), gynecological treatment, spinal treatment, catheterization, head trauma, burn emergencies, and the like. Such modification may be implemented by simply modifying the program 14 and/or the virtual instruments 18 and sensors 20. A simulator may comprise but a portion of the foregoing manikin 28, for example, the arm, head, or pelvic region. The adult-sized manikin 28 may be replaced by a manikin that simulates, for example, a newborn baby, a one-year old child, or a five-year old child. In further variations, additional patient scenarios may be modeled, and any instruments required to treat the patient may be simulated, via the program 14 and the CIM 26, as additional virtual instruments 18 using the techniques described above. The connection between the sensors 20, the CIM 22, and the computer 12 may be effected optically (e.g., via infrared). Other medical and non-medical simulator device training sessions are contemplated. Variations in the software GUI may also be contemplated.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. An interactive, computerized education system for teaching patient care, comprising:

a computer program, for execution on a computer, that displays a selection of modules to assist a user in learning patient care protocols, the modules being selectable by the user for providing different interactive training sessions involving the protocols;

a physiological simulator for receiving simulated patient care activity responsive to the sessions; and a plurality of different virtual instruments for use with the simulator in performing the patient care activity, the virtual instruments cooperating with corresponding sensors that interface with the computer program for providing feedback to the program regarding the activity during the sessions, such that in providing the feedback, the sensors complete an electrical circuit that confirms proper use of the virtual instruments on the simulator; and an interface module for interfacing the sensors with the computer program, the module comprising lines each coupled with one of the sensors and a processor coupled with the sensor lines for receiving signals from the sensors and converting the signals to inputs for the computer program.

2. The system of claim 1 wherein said different virtual instruments are selected from the group consisting of an IV needle, an endotracheal ("ET") tube, an electrocardiogram ("EKG") monitor, a blood pressure ("BP") cuff, a pulse oximeter finder cuff, a temporary external pacer, an automatic external defibrillator ("AED") and manual defibrillators.

3. The system of claim 1 wherein at least one of the sensors is connected to the simulator.

4. The system of claim 1 wherein at least one of the sensors is connected to one of the virtual instruments.

5. The system of claim 1 wherein the sensors further confirm proper operation of the virtual instruments on the simulator.

6. The system of claim 1 wherein the computer program modules comprise:

teaching modules for providing training sessions that display information on techniques for treating victims in accordance with the protocols; and testing modules for providing training sessions that evaluate the ability of the user to perform the techniques described in the teaching modules on the manikin in accordance with the protocols.

7. The system of claim 1 wherein the computer program modules provide the training sessions in a self guiding format using graphics buttons that respond to a point-and-click computer user interface.

8. The system of claim 1 wherein the computer program modules include a test module comprising:

a menu of selectable scenarios each of which scenarios requires a different treatment protocol to be administered during the course of treating a victim; and a presentation of a series of events pertaining to a selected scenario, each event including a description of the event accompanied by a plurality of possible treatment choices to be made in response to the event, at least one of which choices is correct according to the treatment protocol for the scenario, such that the user must enter the correct choice or choices before the next event in the series will be presented.

9. The system of claim 8 wherein the event series presentation of the test module further comprises an indication following the choice entry of whether the entered choice is correct and if not, for displaying an explanation of why the entered choice is not correct.

10. The system of claim 8 wherein the test module further comprises a timer for indicating to the user failure to enter a correct choice within a predetermined time period for the event.

11. The system of claim 8 wherein the test module further comprises a display of a victim electrocardiogram (EKG) corresponding to the event.

12. The system of claim 8 wherein the test module further comprises a display of victim vital signs corresponding to the event.

13. The system of claim 8 wherein the test module further comprises:

a selection for enabling or disabling the virtual instruments during presentation of the selected scenario;

such that when enabled, for events requiring performance of an activity on the simulator, the user entry of the correct choice or choices requires the user to perform the activity on the simulator using the at least one virtual insentient; and such that when disabled, for events requiring performance of an activity on the simulator, the user may complete an event in the selected scenario without performing the activity.

14. An interactive, computerized education system for teaching patient care, comprising:

a computer program, for execution on a computer, that displays a selection of modules to assist a user in learning patient Care protocols, the modules being selectable by the user for providing different interactive training sessions involving the protocols;

a physiological simulator for receiving simulated patient care activity responsive to the sessions;

a plurality of different virtual instruments for use with the simulator in performing the patient care activity, the virtual instruments cooperating with one or more sensors that interface with the computer program for providing feedback to the program regarding the activity during the sessions, such that in providing the feedback, the sensors confirm proper use of the virtual instruments on the simulator; and an interface module for interfacing the sensors with the computer program, the interface module comprising lines each coupled with one of the sensors and a processor coupled with the sensor lines for receiving signals from the sensors and converting the signals to inputs for the computer program;

wherein each of said virtual instruments is different and is selected from the group consisting of an IV needle, an endotracheal ("ET") tube, an electrocardiogram ("EKG") monitor, a blood pressure ("BP") cuff, a pulse oximeter finger cuff, a temporary external pacer, an automatic external defibrillator ("AED") and manual defibrillators; and wherein said interface module comprises a plurality of ports, wherein each of said ports is different and is selected from the group consisting of an intravenous/endotracheal ("IV/ET") port, a ventilation port, a compression port, an EKG port, a blood pressure, pulse oximeter, heartrate ("BP/$O_{SAT}$/HEARTRATE") port, a temporary external pacer port, an AED port, and manual defibrillator ports.

15. The system of claim 14 wherein the sensors are connected to one or both of the instruments and the simulator.

16. A kit for providing an interactive system for teaching patient care, comprising:

a computer program, for execution on a computer, that displays a selection of modules to assist a user in learning patient care protocols, the modules being selectable by the user for providing different interactive training sessions involving the protocols;

a physiological simulator for receiving simulated patient care activity responsive to the sessions;

at least two virtual instruments for use with the simulator in performing the patient care activity, the virtual instruments cooperating with sensors that interface with the computer program for providing feedback to the program regarding the activity during the sessions, such that in providing the feedback, the sensors confirm proper use of the virtual instruments on the simulator; and an interface module for interfacing the sensors with the computer program the interface module comprising lines each coupled with one of the sensors and a processor coupled with the sensor lines for receiving signals from the sensor and converting the signals to inputs for the computer program;

wherein the computer program modules comprise at least one teaching module for providing training sessions that display information on techniques for treating victims in accordance with the protocols and at least one testing module for providing training sessions that evaluate the ability of the user to perform the techniques described in the teaching module on the manikin in accordance with the protocols;

such that the testing module comprises a menu of selectable scenarios each one of which requires a different treatment protocol to be administered during the course of treating a victim; and a presentation of a series of events pertaining to a selected scenario, each event including a description of the event accompanied by a plurality of possible treatment choices to be made in response to the event, at least one of which choices is correct according to the treatment protocol for the scenario, such that the user is prompted to enter the correct choice or choices before the next event in the series will be presented; wherein the event series presentation of the testing module further comprises an indication following the choice entry of whether the entered choice is correct and if not, for displaying an explanation of why the entered choice is not correct.

17. The kit of claim 16 wherein the testing module further comprises: a selection for enabling or disabling the virtual instruments during the scenario event presentation;

such that when enabled, for events requiring performance of an activity on the simulator, the user entry of the correct choice or choices requires the user to perform the activity on the simulator using the at least one virtual instrument; and such that when disabled, for events requiring performance of an activity on the simulator, the user may complete an event in the code scenario without performing the activity.

* * * * *